US010375606B2

(12) United States Patent
Futaki et al.

(10) Patent No.: US 10,375,606 B2
(45) Date of Patent: Aug. 6, 2019

(54) RADIO COMMUNICATION SYSTEM, RADIO STATION, RADIO TERMINAL, COMMUNICATION CONTROL METHOD, AND COMPUTER-READABLE MEDIUM

(71) Applicant: NEC Corporation, Tokyo (JP)

(72) Inventors: Hisashi Futaki, Tokyo (JP); Hiroaki Aminaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/655,984

(22) PCT Filed: Nov. 20, 2013

(86) PCT No.: PCT/JP2013/006804
§ 371 (c)(1),
(2) Date: Jun. 26, 2015

(87) PCT Pub. No.: WO2014/103145
PCT Pub. Date: Jul. 3, 2014

(65) Prior Publication Data
US 2015/0341829 A1 Nov. 26, 2015

(30) Foreign Application Priority Data

Dec. 28, 2012 (JP) .................................. 2012-288211

(51) Int. Cl.
*H04W 36/00* (2009.01)
*H04W 36/08* (2009.01)
(Continued)

(52) U.S. Cl.
CPC ....... *H04W 36/0016* (2013.01); *H04W 36/00* (2013.01); *H04W 36/0033* (2013.01);
(Continued)

(58) Field of Classification Search
CPC ......... H04L 47/10; H04L 47/14; H04L 47/30; H04L 47/263; H04W 72/1284; H04W 28/12
(Continued)

(56) References Cited

U.S. PATENT DOCUMENTS 6,097,709 A * 8/2000 Kuwabara ............ H04B 7/2696
370/331
2010/0246382 A1* 9/2010 Yi .......................... H04L 63/12
370/216
(Continued)

FOREIGN PATENT DOCUMENTS

CN 102833802 A 12/2012
EP 2846583 A1 3/2015
(Continued)

OTHER PUBLICATIONS

3GPP TS 36.423 V11.2.0, "Evolved Universal Terrestrial Radio Access Network (E-UTRAN), X2 application protocol (X2AP)", pp. 1-136, Sep. 2012.
(Continued)

*Primary Examiner* — Faruk Hamza
*Assistant Examiner* — Jean F Voltaire
(74) *Attorney, Agent, or Firm* — Finnegan, Henderson, Farabow, Garrett & Dunner, L.L.P.

(57) ABSTRACT

A radio network (6) and a radio terminal (4) are configured to, when the radio terminal (4) is using a first cell (10) served by a first radio station (1) as a primary cell and a second cell (20) served by a second radio station (2) as a secondary cell, change the primary cell from the first cell (10) to a third cell (30) served by a third radio station (3) while keeping communication status information regarding the radio terminal (1) on the second cell (20). It is thus, for example, possible to enable a communication service in the secondary
(Continued)

cell to be continued even after the primary cell is changed when the primary cell is changed during execution of carrier aggregation (e.g., Inter-eNB CA) on a plurality of cells served by different radio stations.

28 Claims, 24 Drawing Sheets

(51) Int. Cl.
  *H04W 36/28* (2009.01)
  *H04W 76/20* (2018.01)
  *H04W 76/28* (2018.01)
  *H04B 7/022* (2017.01)
  *H04W 76/15* (2018.01)

(52) U.S. Cl.
  CPC ....... *H04W 36/0069* (2018.08); *H04W 36/08* (2013.01); *H04W 36/28* (2013.01); *H04W 76/20* (2018.02); *H04W 76/28* (2018.02); *H04B 7/022* (2013.01); *H04W 76/15* (2018.02); *Y02D 70/1242* (2018.01); *Y02D 70/1262* (2018.01); *Y02D 70/146* (2018.01); *Y02D 70/442* (2018.01)

(58) Field of Classification Search
  USPC .......................................................... 370/331
  See application file for complete search history.

(56) References Cited

U.S. PATENT DOCUMENTS

| | | | | |
|---|---|---|---|---|
| 2011/0177815 | A1* | 7/2011 | Jeong .................... | H04W 48/14 455/436 |
| 2012/0147830 | A1* | 6/2012 | Lohr ................... | H04W 72/042 370/329 |
| 2014/0004863 | A1* | 1/2014 | Zhang ............... | H04W 36/0033 455/444 |
| 2014/0087731 | A1 | 3/2014 | Zhang et al. | |
| 2015/0117405 | A1 | 4/2015 | Takahashi | |
| 2015/0208283 | A1 | 7/2015 | Yang et al. | |

FOREIGN PATENT DOCUMENTS

| | | |
|---|---|---|
| JP | 2013-255174 | 12/2013 |
| WO | WO 2011/100492 A1 | 8/2011 |
| WO | WO 2011/122045 A1 | 10/2011 |
| WO | WO 2011/137784 A1 * | 11/2011 |
| WO | WO 2012/159529 A1 | 11/2012 |
| WO | WO 2013/143613 A1 | 10/2013 |
| WO | WO 2013/157537 A1 | 10/2013 |

OTHER PUBLICATIONS

3GPP TS 36.331 V11.1.0, "Evolved Universal Terrestrial Radio Access (E-UTRA), Radio Resource Control (RRC), Protocol specification", pp. 1-325, Sep. 2012.

3GPP TS 36.300 V11.3.0, "Evolved Universal Terrestrial Radio Access (E-UTRA) and Evolved Universal Terrestrial Radio Access Network (E-UTRAN), Overall description, Stage 2", pp. 1-205, Sep. 2012.

Samsung Electronics, "Technologies for Rel-12 and Onwards", RWS-120046, 3GPP TSG RAN Workshop on Rel-12 and Onwards, pp. 1-31, Jun. 2012.

NTT Docomo, Inc., "Requirements, Candidate Solutions & Technology Roadmap for LTE Rel-12 Onward", RWS-120010, 3GPP Workshop on Release 12 and onwards, pp. 1-27, Jun. 2012.

Ericsson, "[70#14] LTE: Removal of Activation/Deactivation from Rel-10", 3GPP TSG-RAN WG2 #70bis, Tdoc R2-103878, pp. 1-27, Jul. 2010.

International Search Report dated Feb. 25, 2014 in corresponding PCT International Application.

NEC, "PCell change in dual connectivity", 3GPP TSG RAN2 Meeting #85, R2-140511, Feb. 2014.

NEC, "MeNB to (M)eNB handover procedure", 3GPP TSG RAN2 Meeting #85bis, R2-141557, Apr. 2014.

Extended European Search Report dated May 3, 2016 by the European Patent Office in counterpart European Patent Application No. 13867525.1.

Official Communication issued by the European Patent Office in counterpart European Patent Application No. 13 867 525.1-1854, issued Apr. 10, 2017.

Ericsson: "Overall procedures for offloading over Xn", 3GPP Draft; R3-131794, 3rd Generation Partnership Project (3GPP), Mobile Competence Centre ; vol. RAN WG2, No. 20131007-20131019, XP050720009 (2013).

Nsn et al: "Handover procedure in case of bearer only served by SeNB (1 A)", 3GPP Draft; R3-1321 01 Han Dover Procedure for 1 A, 3rd Generation Partnership Project (3GPP), Mobile Competence Centre, vol. RAN WG3, No. 20131111-20131115, XP050738361 (2013).

Notification of Reasons for Refusal issued by the Japanese Patent Office in counterpart Japanese Patent Application No. 2014-554087, dated Dec. 12, 2017.

European Patent Office Communication Pursuant to Article 94(3) EPC (European Office Action) dated Jun. 12, 2018, issued in counterpart European Patent Application No. 13 867 525.1.

* cited by examiner

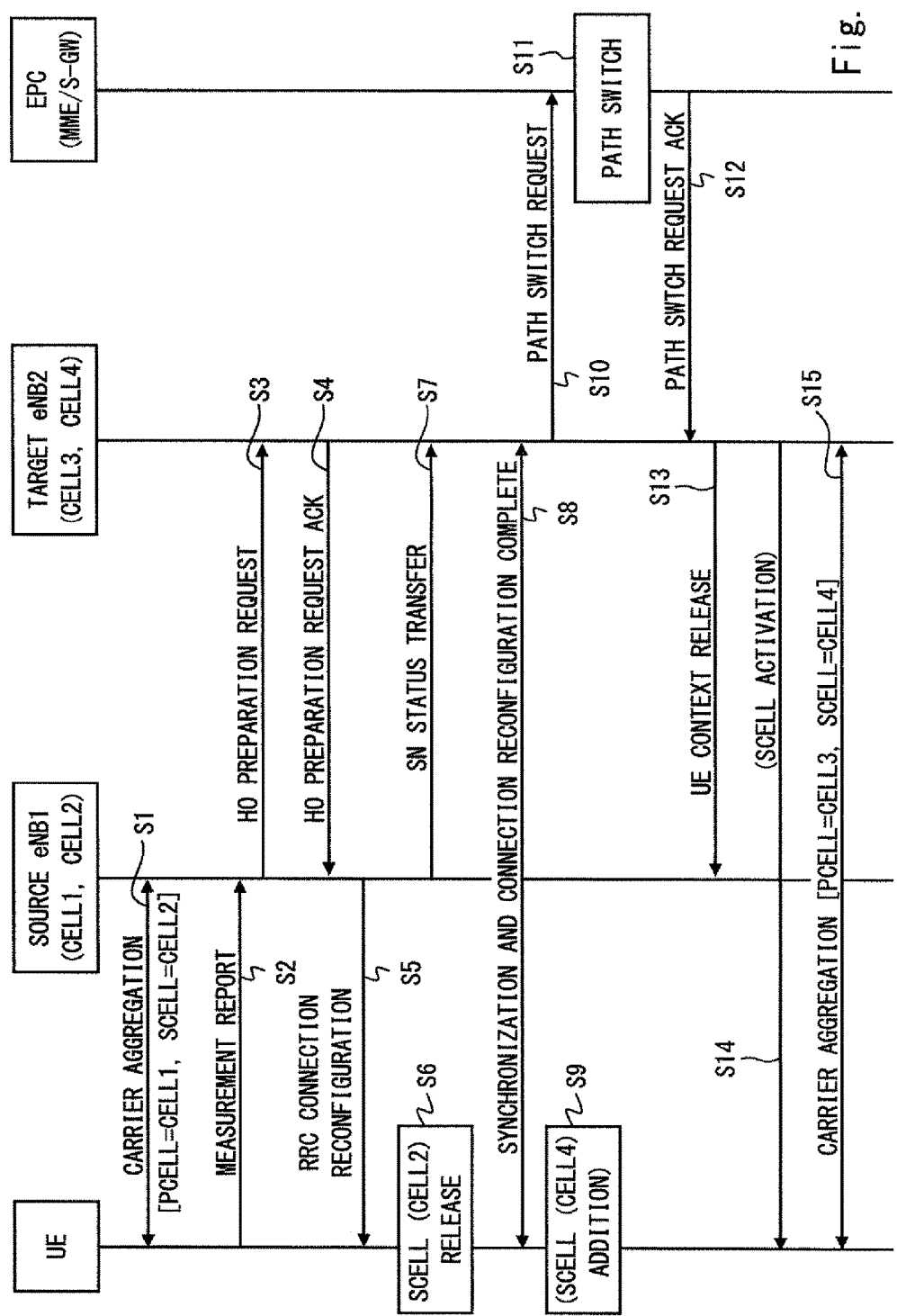

RADIO COMMUNICATION SYSTEM, RADIO STATION, RADIO TERMINAL, COMMUNICATION CONTROL METHOD, AND COMPUTER-READABLE MEDIUM

CROSS-REFERENCE TO RELATED PATENT APPLICATIONS

This application is a National Stage Entry of International Application No. PCT/JP2013/006804, filed Nov. 20, 2013, which claims priority from Japanese Patent Application No. 2012-288211, filed Dec. 28, 2012. The entire contents of the above-referenced applications are expressly incorporated herein by reference.

TECHNICAL FIELD

The present invention relates to a radio communication system in which a radio station and a radio terminal communicate with each other using a plurality of cells.

BACKGROUND ART

In order to improve communication quality and speed further to cope with an abrupt increase in mobile data traffic in recent years, standardization of a carrier aggregation (CA) function of allowing a radio base station (eNode B (eNB)) and a radio terminal (user equipment (UE)) to communicate with each other using a plurality of cells has been discussed in 3GPP LTE (Long Term Evolution). The cells that a UE can use in the CA are limited to cells of one eNB (i.e., cells served by one eNB).

The cells used by the UE are classified into a primary cell (PCell) which has already been used as a serving cell at the start of CA and a secondary cell (SCell) which is used additionally or subordinately. Non-Access Stratum (NAS) mobility information, security information (security input), and the like are sent and received through the PCell during radio connection (re)-establishment (RRC connection Establishment/Re-establishment) (see Non-Patent Literature 1). A DL carrier corresponding to the PCell is a DL primary component carrier (DL PCC) and its corresponding UL carrier is an UL PCC. Similarly, a DL carrier corresponding to the SCell is a DL secondary component carrier (DL SCC) and its corresponding UL carrier is an UL SCC.

When a UE that has been executing CA performs an inter-base station handover (Inter-eNB handover), the SCell(s) is released (see Non-Patent Literatures 2 and 3). In the following, with reference to a sequence diagram of FIG. 24, a procedure in which a UE that has been executing CA on Cell1 and Cell2 of a source eNB1 performs a handover to Cell3 of a target eNB2 will be described.

In step S1, a UE performs CA using Cell1 of eNB1 as a PCell and using Cell2 of the same eNB1 as a SCell. In step S2, the UE transmits a terminal measurement report (Measurement report) to the eNB1. In this example, the measurement report includes measurement results of Cell3 that serves as a handover target.

In step S3, the eNB1 sends a handover request (handover (HO) preparation request) to the eNB2. The HO preparation request includes a list (sourceSCellConfigList) of SCell(s) (in this example, the Cell2) which is used for CA in the eNB1. The HO preparation request may include a list (candidateCellInfoList) of candidate cell(s) used after the handover. In step S4, the eNB2 sends to the eNB1 an acknowledgement response (HO preparation request ACK) to the handover request. The HO preparation request ACK includes a list (sCellToReleaseList) of released SCell(s) (in this example, the Cell2). The HO preparation request ACK may include a list (sCellToAddModList) of SCell(s) (in this example, Cell4) to be used after the handover.

In step S5, the eNB1 transmits a message (RRC Connection Reconfiguration) instructing the UE to perform a handover to the Cell3 of the eNB2. At this time, the sCellToReleaseList, the sCellToAddModList, and the like, which has been sent from the eNB2 to the eNB1, are also transmitted to the UE. In step S6, the eNB1 sends a communication status of the UE to the eNB2 (SN status transfer). In step S7, the UE releases the SCell (i.e., the Cell2) (SCell release). In step S8, the UE synchronize with the eNB2 in the Cell3 and completes the handover process (Synchronization and RRC Connection Reconfiguration Complete). In step S9, when the UE has been instructed to add the Cell4 as SCell, the UE executes the request (SCell addition).

In step S10, the eNB2 sends a path switching request to a core network (EPC) (Path switch request). In step S11, the EPC executes path switching (Path switch). In step S12, the EPC notifies the eNB2 of completion of path switching (Path switch request ACK). In step S13, the eNB2 notifies the eNB1 of the release (acknowledgement of release) of terminal information (UE context release). In step S14, when the eNB2 has instructed the UE to add the Cell4 as the SCell, the eNB2 instructs the UE to activate the Cell4 (SCell activation). In step S15, the UE performs CA using the Cell3 as the PCell and using the Cell4 as the SCell.

Moreover, a concept of Inter-eNB CA of aggregating a plurality of cells served by different eNBs has been proposed (Non-Patent Literature 4). For example, the Inter-eNB CA may use a macro cell served by a macro base station (Macro eNB (MeNB)) and a pico cell served by a pico base station (Pico eNB (PeNB)).

Further, a method has been proposed in which signals for control-plane including mobility management of a UE are transmitted and received using a macro cell having a wide coverage and data-plane signals such as user data are transmitted and received using a pico cell which provides relatively better communication quality (Non-Patent Literature 5). This method is referred to as C/U Split.

CITATION LIST

Non Patent Literature

[Non-Patent Literature 1] 3GPP TS 36.300 V11.3.0, "Evolved Universal Terrestrial Radio Access (E-UTRA) and Evolved Universal Terrestrial Radio Access Network (E-UTRAN); Overall description; Stage 2," Section 7.5, September 2012

[Non-Patent Literature 2] 3GPP TS 36.331 V11.1.0, "Evolved Universal Terrestrial Radio Access (E-UTRA); Radio Resource Control (RRC); Protocol specification," Section 5.3.5.4, September 2012

[Non-Patent Literature 3] 3GPP TS 36.423 V11.2.0, "Evolved Universal Terrestrial Radio Access Network (E-UTRAN); X2 application protocol (X2AP)," Section 9.1.1, September 2012

[Non-Patent Literature 4] 3GPP RWS-120046, Samsung Electronics, "Technologies for Rel-12 and Onwards," 3GPP TSG RAN Workshop on Rel-12 and Onwards Ljubljana, Slovenia, 11-12 Jun. 2012

[Non-Patent Literature 5] 3GPP RWS-120010, NTT DOCOMO, "Requirements, Candidate Solutions & Technology Roadmap for LTE Rel-12 Onward," 3GPP TSG RAN Workshop on Rel-12 and Onwards Ljubljana, Slovenia, 11-12 Jun. 2012

SUMMARY OF INVENTION

Technical Problem

In the Inter-eNB CA, for example, a cell of the macro base station (Macro eNB (MeNB)) and a cell of a low-power base station (Low-Power Node (LPN)) are used simultaneously as a PCell and a SCell, respectively. In this case, bearers are separately configured in the PCell and the SCell. The UE communicates with the MeNB through a bearer in the PCell and communicates with the LPN through the bearer in the SCell.

The inventors of this application has conducted various studies on the continuity of communication services when a radio terminal (UE) that has been executing Inter-eNB CA performs a handover and has found several problems. For example, a case in which a UE that is executing Inter-eNB CA using a cell of a MeNB as a PCell and using a cell of a LPN as a SCell performs a handover to another MeNB, and thus, a primary cell is changed will be considered. When the handover procedure (FIG. 24) of a UE being executing normal CA (i.e., Intra-eNB CA) is applied to this handover, the UE has to release the SCell (cell of the LPN). Thus, a problem occurs in that communication services provided in the SCell cannot be continued after the handover. The cause of this problem is as follows. In the case of Intra-eNB CA, the same bearer is configured in the PCell and the SCell, a source eNB sends communication status (SN status) in the PCell to a target eNB, and a UE also keeps (stores) the communication status. Thus, in the case of Intra-eNB CA, the service of the SCell is continued after the handover based on the communication status of the PCell. In contrast, when the SCell is released in the Inter-eNB CA, the bearer information on the SCell, including the communication status of the SCell, is discarded. That is, the Inter-eNB CA does not have a mechanism for transferring the communication status of the SCell to the target eNB, and thus the service of the SCell cannot be continued after the handover.

Accordingly, an object of the present invention is to provide a radio communication system, a radio station, a radio terminal, a communication control method, and a program which contribute to enabling a communication service in a secondary cell to be continued even after a primary cell is changed, when the primary cell is changed during execution of carrier aggregation (e.g., Inter-eNB CA) on a plurality of cells served by different radio stations.

Solution to Problem

In a first aspect, a radio communication system includes a radio terminal and a radio network including first to third radio stations. The first to third radio stations serve first to third cells, respectively. The radio terminal has a capability of, while using a cell of one radio station as a primary cell, using a cell of another radio station as a secondary cell. Furthermore, the radio network and the radio terminal are configured to, when the radio terminal is using the first cell as the primary cell and the second cell as the secondary cell, change the primary cell from the first cell to the third cell while keeping communication status information regarding the radio terminal on the second cell.

In a second aspect, a first radio station includes a radio communication unit that serves a first cell, and a communication control unit. The communication control unit is configured to, when changing a primary cell from the first cell to a third cell served by a third radio station while a radio terminal is using the first cell as the primary cell and using a second cell served by a second radio station as a secondary cell, send to the second radio station at least one of (a) a request to abort or suspend communication with the radio terminal in the second cell and (b) a request to report communication status information regarding the radio terminal on the second cell.

In a third aspect, a second radio station includes a radio communication unit that serves a second cell, and a communication control unit. The communication control unit is configured to, when a primary cell is changed from a first cell served by a first radio station to a third cell served by a third radio station while a radio terminal is using the first cell as the primary cell and using the second cell as a secondary cell, receive from the first radio station an instruction to abort or suspend data communication with the radio terminal in the second cell, and abort or suspend the data communication.

In a fourth aspect, a third radio station includes a radio communication unit that serves a third cell, and a communication control unit. The communication control unit is configured to, when a primary cell is changed from a first cell served by a first radio station to the third cell while a radio terminal is using the first cell as the primary cell and using a second cell served by a second radio station as a secondary cell, perform at least one of (a) receiving communication status information regarding the radio terminal on the second cell and (b) sending to the second radio station an instruction to resume data communication which has been provided to the radio terminal in the second cell.

In a fifth aspect, a radio terminal includes radio communication unit configured to communicate with first to third radio stations, and a communication control unit. The communication control unit is configured to perform control of, while using a first cell of the first radio station as a primary cell, using a second cell served by the second radio station as a secondary cell. The communication control unit is further configured to, when the first cell is being used as the primary cell and the second cell is being used as the secondary cell, change the primary cell from the first cell to a third cell served by the third radio station while keeping communication status information regarding the radio terminal on the second cell.

In a sixth aspect, a communication control method, in a first radio station that serves a first cell, includes when changing a primary cell from the first cell to a third cell served by a third radio station while a radio terminal is using the first cell as the primary cell and the a second cell served by a second radio station as a secondary cell, sending to the second radio station at least one of (a) an instruction to abort or suspend communication with the radio terminal in the second cell and (b) a request to report communication status information regarding the radio terminal on the second cell.

In a seventh aspect, a communication control method, in a second radio station that serves a second cell, includes: when a primary cell is changed from a first cell served by a first radio station to a third cell served by a third radio station while a radio terminal is using the first cell as the primary cell and using the second cell as a secondary cell, receiving from the first radio station an instruction to abort or suspend data communication with the radio terminal in the second cell; and aborting or suspending the data communication.

In an eighth aspect, a communication control method, in a third radio station that serves a third cell, includes when a primary cell is changed from a first cell served by a first radio station to the third cell while a radio terminal is using the first cell as the primary cell and using a second cell served by a second radio station as a secondary cell, performing at least one of (a) receiving communication status information regarding the radio terminal on the second cell and (b) sending to the second radio station an instruction to resume data communication which has been provided in the second cell.

In a ninth aspect, a communication control method, in a radio terminal, includes: (a) while using a first cell of a first radio station as a primary cell, using a second cell served by a second radio station as a secondary cell; and (b) when the first cell is being used as the primary cell and the second cell is being used as the secondary cell, changing the primary cell from the first cell to a third cell served by a third radio station while keeping communication status information regarding the radio terminal on the second cell.

In a tenth aspect, a program includes instructions for causing a computer to perform the communication control method according to the sixth aspect described above.

In an eleventh aspect, a program includes instructions for causing a computer to perform the communication control method according to the seventh aspect described above.

In a twelfth aspect, a program includes instructions for causing a computer to perform the communication control method according to the eighth aspect described above.

In a thirteenth aspect, a program includes instructions for causing a computer to perform the communication control method according to the ninth aspect described above.

Advantageous Effects of Invention

According to the aspects, it is possible to provide a radio communication system, a radio station, a radio terminal, a communication control method, and a program which contribute to enabling a communication service in a secondary cell to be continued even after a primary cell is changed when the primary cell is changed during execution of carrier aggregation (e.g., Inter-eNB CA) on a plurality of cells served by different radio stations.

BRIEF DESCRIPTION OF DRAWINGS

FIG. 24 is a sequence diagram illustrating a handover procedure in carrier aggregation of LTE (Background Art).

DESCRIPTION OF EMBODIMENTS

Figure 1:
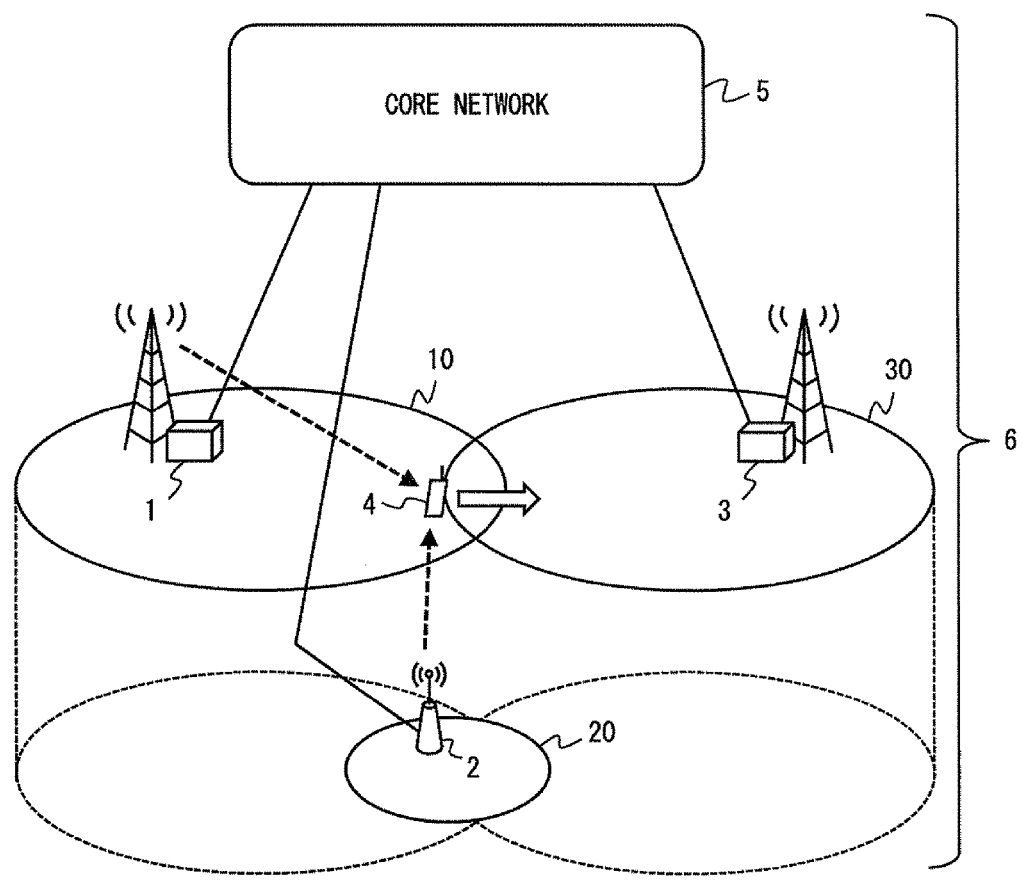
FIG. 1 is a diagram illustrating a configuration example of a radio communication system according to a first embodiment.

Hereinafter, specific embodiments will be described in detail with reference to the drawings. In the respective drawings, the same or corresponding elements are denoted by the same reference numerals, and redundant description thereof will not be provided as necessary in order to clarify the description.

First Embodiment

FIG. 1 illustrates a configuration example of a radio communication system according to this embodiment. The radio communication system according to this embodiment includes a radio network 6 and a radio terminal 4. The radio network 6 includes a first radio station 1, a second radio station 2, a third radio station 3, and a core network 5 connected to the radio stations 1 to 3. The radio stations 1, 2, and 3 serve a first cell 10, a second cell 20, and a third cell 30, respectively. The radio stations 1 to 3 are, for example, radio base stations or base station controllers. The radio terminal 4 has a capability of using a cell of another radio station as a secondary cell (SCell) while using a cell of one radio station as a primary cell (PCell). In other words, the radio terminal 4 supports carrier aggregation on a plurality of cells which is served by different radio stations. The primary cell (PCell) is a cell which has already been used as a serving cell of the radio terminal 4 at the start of carrier aggregation. The secondary cell (SCell) is a cell which is additionally or subordinately used for the carrier aggregation in the radio terminal 4.

For example, the radio terminal 4 can establish a second radio connection in the second cell 20 while maintaining a first radio connection in the first cell 10 and can use the first cell 10 as the primary cell (PCell) and the second cell 20 as the secondary cell (SCell). In this way, the radio terminal 4 can use a plurality of cells (e.g., the cells 10 and 20) simultaneously in order to transmit or receive signals (e.g., user data or control information). The expression "use a plurality of cells simultaneously" is not limited to a case in which signals are actually received or transmitted simultaneously in the plurality of cells. The expression may refer to a case in which signals are received or transmitted in only one or several cells actually although a state where signals can be received or transmitted in all of the plurality of cells is created. The expression may also refer to a case in which different kinds of signals are received or transmitted in respective cells. Alternatively, the expression may refer to a case in which each of the plurality of cells is used for either receiving or transmitting signals. From the perspective of carrier aggregation on a plurality of cells served by different radio stations, the capability of using a plurality of cells served by different radio stations can be referred to as inter-radio station carrier aggregation. Moreover, from the perspective of simultaneous use of a plurality of cells, the capability of using a plurality of cells served by different radio stations can be referred to as Dual Connection, Dual Connectivity, Multi-Connection, Multi-Connectivity, or the like.

The radio terminal 4 may transmit to a radio station a terminal capability report indicating that inter-radio station carrier aggregation is supported, or may implicitly indicate that inter-radio station carrier aggregation is supported by the category, the device release number, or the like of the radio terminal 4. Moreover, as described above, the capability of inter-radio station carrier aggregation can be referred to as dual connection capability or multi-connection capability.

FIG. 1 illustrates a heterogeneous network (HetNet) environment. Specifically, the first cells 10 and 30 illustrated in FIG. 1 have a wider coverage than the second cell 20. Moreover, FIG. 1 illustrates a hierarchical cell structure in which the second cell 20 is deployed near the boundary between the first cell 10 and the third cell. However, the cell structure illustrated in FIG. 1 is an example only. In some implementations, the cells 10, 20, and 30 may have the same degree of coverage. In other words, the radio communication system according to this embodiment may be applied to a homogeneous network environment.

The radio communication system according to this embodiment operates in the following manner in order to enable a service provided in the SCell (i.e., the cell 20) to be continued even after the PCell is changed when the radio terminal 4 changes the PCell from the cell 10 to the cell 30 during execution of inter-radio station carrier aggregation on the cells 10 and 20. That is, when the radio terminal 4 is using the first cell 10 as the PCell and the second cell 20 as the SCell, the radio terminal 4 and the radio network 6 execute a procedure (e.g., a handover procedure) for changing the PCell from the first cell 10 to the third cell 30 while keeping (storing) communication status information regarding the radio terminal 4 on the second cell 20. The radio terminal 4 and the radio network 6 may keep the communication status information on the cell 20 without releasing it during execution of the PCell change procedure.

More specifically, when performing the inter-radio station carrier aggregation using the cell 10 as a PCell and the cell 20 as a SCell, the radio terminal 4 changes the PCell from the first cell 10 to the third cell 30 while keeping the communication status information on the first cell 10 (i.e., the PCell) and the second cell 20 (i.e., the SCell). Moreover, after changing the PCell to the third cell 30, the radio terminal 4 resumes communication based on the communication status information kept therein. That is, the radio terminal 4 resumes, in the second cell 20 or the third cell 30, the continuity of data communication (also referred to as data communication service, communication service, or simply service) which has been provided in the second cell 20 as the SCell. Here, the continuity of data communication may mean a strict sense of continuity, or may mean the continuity of services performed by the data communication. Moreover, if transmission of a certain packet through the cell 20 has failed, the continuity of data communication may mean re-transmission of the packet through the cell 20 or 30.

When performing the inter-radio station carrier aggregation with the radio terminal 4, which uses the cell 10 as the PCell and the cell 20 as the SCell, the radio network 6 changes the PCell of the radio terminal 4 from the first cell 10 to the third cell 30 while keeping the communication status information regarding the radio terminal 4 on the first cell 10 and the second cell 20. Moreover, after changing the PCell of the radio terminal 4 to the third cell 30, the radio network 6 resumes the communication based on the communication status information kept therein. That is, the radio network 6 resumes, in the second cell 20 or the third cell 30, the continuity of data communication (also referred to as data communication service, communication service, or simply service) which has been provided in the second cell 20 as the SCell.

Accordingly, the radio communication system can allow the continuity of the data communication performed in the cells 10 and 20 even after the PCell is changed to the cell 30 of the radio station 3 when the radio terminal 4 is performing data communication (also referred to as data communication service, communication service, or simply service) using the cells 10 and 20 of the radio stations 1 and 2 as the PCell and the SCell, respectively.

In the above description, the third radio station 3 may be the same as the first radio station 1. In other words, the first cell 10 and the third cell 30 may be different cells or sectors provided by one radio station 1.

The communication status information on the SCell (cell 20) kept in the radio terminal 4 and the radio network 6 may be information necessary for resuming the data communication, performed in the SCell (cell 20) before the change of the PCell, after the PCell is changed. Thus, the communication status information on the SCell may contain, for example, contents similar to communication status information on a source cell which is sent from a source cell radio station to a target cell radio station during a normal handover. The communication status information on the SCell may be referred to as information indicating a communication status or service status of the radio terminal 4 on the SCell. The communication status information on the SCell may be a communication status of each service or may be communication statuses of a plurality of services. The communication status information may include, for example, at least one of the following information elements:

Transmission or reception status of user data (User Plane (U-plane));
Service information;
Bearer information; and
Radio resource configuration information.

Here, the bearer is, for example, a signaling radio bearer (SRB), a data radio bearer (DRB), or a network bearer (S1 bearer, E-RAB, or EPS bearer).

In this embodiment, the change procedure for changing the PCell from the cell 10 to the cell 30 may be a general handover procedure.

The radio terminal 4 may keep the communication status information on the SCell at the time of changing the PCell in the following manner. The radio terminal 4 may release the bearer (SCell bearer or secondary bearer) in the second cell 20 configured for the radio terminal 4 and keep the communication status information. Alternatively, the radio terminal 4 may release the bearer (SCell bearer) in the second cell 20 but may keep the configuration information of the bearer in the second cell and the communication status information. Alternatively, the radio terminal 4 may keep the communication status information while maintaining the bearer (SCell bearer) in the second cell 20 configured for the radio terminal 4. When the SCell bearer is released, the radio terminal 4 may consider and treat the information regarding the SCell bearer as if it were information regarding the bearer (PCell bearer or primary bearer) in the first cell 10 configured for the radio terminal 4. For example, the radio terminal 4 may treat bearer configuration information, excluding radio bearer configuration, similarly to that of the PCell bearer. In other words, processes such as keeping, updating, resetting, or reconfiguring of SCell bearer configuration information may be performed similarly to those of PCell bearer configuration information. The PCell bearer (or the SCell bearer) may be, but is not limited to, a radio bearer or a network bearer configured in the PCell (or the SCell), for example.

The radio network 6 may keep the communication status information on the SCell by the same method as the radio terminal 4. That is, the radio network 6 may release the bearer (SCell bearer) in the second cell 20 configured for the radio terminal 4 and may keep the communication status information. Alternatively, the radio network 6 may release the bearer (SCell bearer) in the second cell 20 but may keep the configuration information regarding the bearer in the second cell and the communication status information. Alternatively, the radio network 6 may keep the communication status information while maintaining the bearer (SCell bearer) in the second cell 20 configured for the radio terminal 4. When the SCell bearer is released, the radio network 6 may reconfigure the released SCell bearer as the bearer (PCell bearer) in the first cell 10 to thereby treat the released SCell bearer as the PCell bearer. For example, the radio network 6 may change the SCell bearer to the PCell bearer by switching the path (route) of the SCell bearer to the PCell and may inherit the configuration information on the SCell bearer, excluding the radio bearer configuration, to the PCell bearer. That is, the bearer configuration information regarding the SCell bearer, excluding the radio bearer configuration, is inherited to the PCell bearer. The PCell bearer (or the SCell bearer) may be, but is not limited to, a radio bearer or a network bearer configured in the PCell (or the SCell), for example.

As described above, the data communication which has been provided in the second cell 20 as the SCell before the change of the PCell may be resumed in the third cell 30 (i.e., the PCell after the change) after the PCell is changed. In this case, the radio network 6 may transfer, from the radio station 2 to the radio station 3, the communication status information regarding the radio terminal 4 on the cell 20. Instead of this, the data communication which has been provided in the second cell 20 may be resumed in the second cell 20 after the PCell is changed. In this case, the radio network 6 may keep, in the radio station 2, the communication status information regarding the radio terminal 4 on the cell 20. After having changed the PCell, the radio network 6 may perform carrier aggregation with the radio terminal 4 using the cell 30 as the PCell and the cell 20 as the SCell.

Hereinafter, the data communication will be described as a broad sense of service. From the perspective of a radio network, the service referred herein includes, but is not limited to, transmission of downlink data and control-plane signaling, reception of uplink data and control-plane signaling, and transmission and reception of downlink and uplink voice calls. Similarly, from the perspective of a radio terminal, the service includes, but is not limited to, reception of downlink data and control signals, transmission of uplink data and control signals, and reception and transmission of downlink and uplink voice calls. Hereinafter, the embodiments of the present invention are basically described by way of an example of a downlink service. However, the present invention can naturally be applied to an uplink service.

Figure 2:
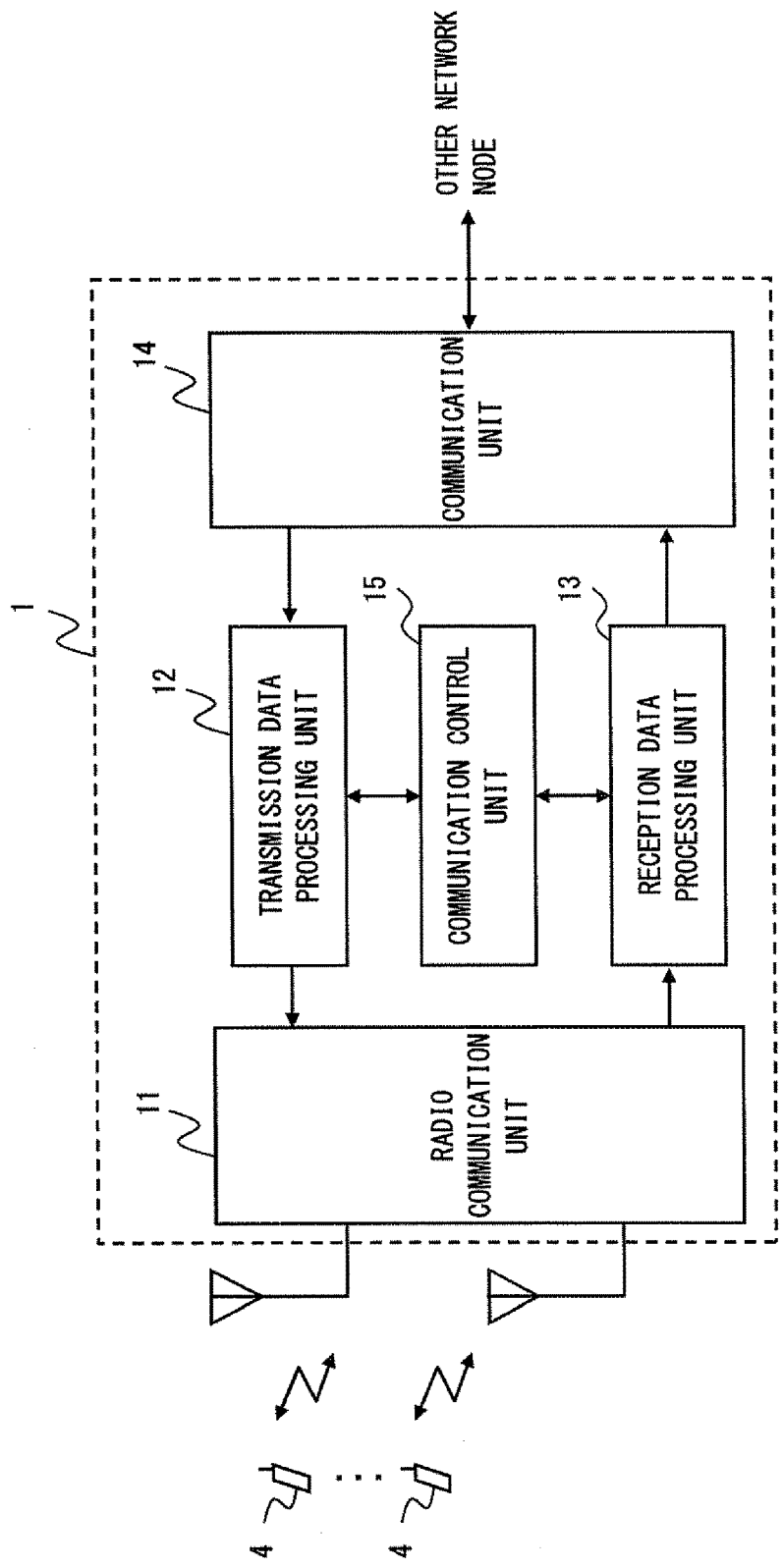
FIG. 2 is a diagram illustrating a configuration example of a first radio station according to the first embodiment.

Next, configuration examples of the radio stations 1 to 3 and the radio terminal 4 according to this embodiment will be described. FIG. 2 is a block diagram illustrating a configuration example of the first radio station 1. A radio communication unit 11 receives an uplink signal transmitted from the radio terminal 4 via an antenna. A reception data processing unit 13 restores the received uplink signal. Obtained received data is transferred to another network node (e.g., a data transfer apparatus or a mobility management apparatus in the core network 5) or another radio station via a communication unit 14. For example, uplink user data received from the radio terminal 4 is transferred to a data transfer apparatus in the core network 5. Moreover, non-access stratum (NAS) control data among control data received from the radio terminal 4 is transferred to a mobility management apparatus in the core network 5. Further, the reception data processing unit 13 receives, from a communication control unit 15, control data to be transmitted to the radio station 2 or 3 and sends the control data to the radio station 2 or 3 via the communication unit 14.

A transmission data processing unit 12 acquires user data destined for the radio terminal 4 from the communication unit 14 and performs processes such as error correction coding, rate matching, and interleaving to generate a transport channel. Further, the transmission data processing unit 12 then generates a transmission symbol sequence by adding control information to the data sequence of the transport channel. The radio communication unit 11 generates a downlink signal by performing processing such as carrier wave modulation based on the transmission symbol sequence, frequency conversion, and signal amplification, and transmits the generated downlink signal to the radio terminal 4. Furthermore, the transmission data processing unit 12 receives control data to be transmitted to the radio terminal 4 from the communication control unit 15 and transmits the control data to the radio terminal 4 via the radio communication unit 11.

The communication control unit 15 controls the inter-radio station carrier aggregation which uses the first cell 10 as the PCell and the second cell 20 as the SCell. Further, the communication control unit 15 performs a procedure for changing the PCell of the radio terminal 4 from the first cell 10 to the third cell 30 while keeping the communication status information regarding the radio terminal 4 on the SCell (second cell 20) in the radio network 6 and the radio terminal 4. The communication control unit 15 performs the PCell change procedure in cooperation with the radio station 2, the radio station 3, and the radio terminal 4.

In an example, the communication control unit 15 may receive the communication status information regarding the radio terminal 4 on the SCell (second cell 20) from the second radio station 2, and then send the communication status information to the third radio station 3. Moreover, the communication control unit 15 may request the core network 5 or the second radio station 2 to switch the bearer in the cell 20 (SCell bearer) to a bearer in the cell 10 (PCell bearer). In another example, the communication control unit 15 may instruct the second radio station 2 to suspend providing a service in the SCell while keeping the communication status information regarding the radio terminal 4 on the SCell (second cell 20). The details of control and signaling performed by the communication control unit 15 will be described later.

Figure 3:
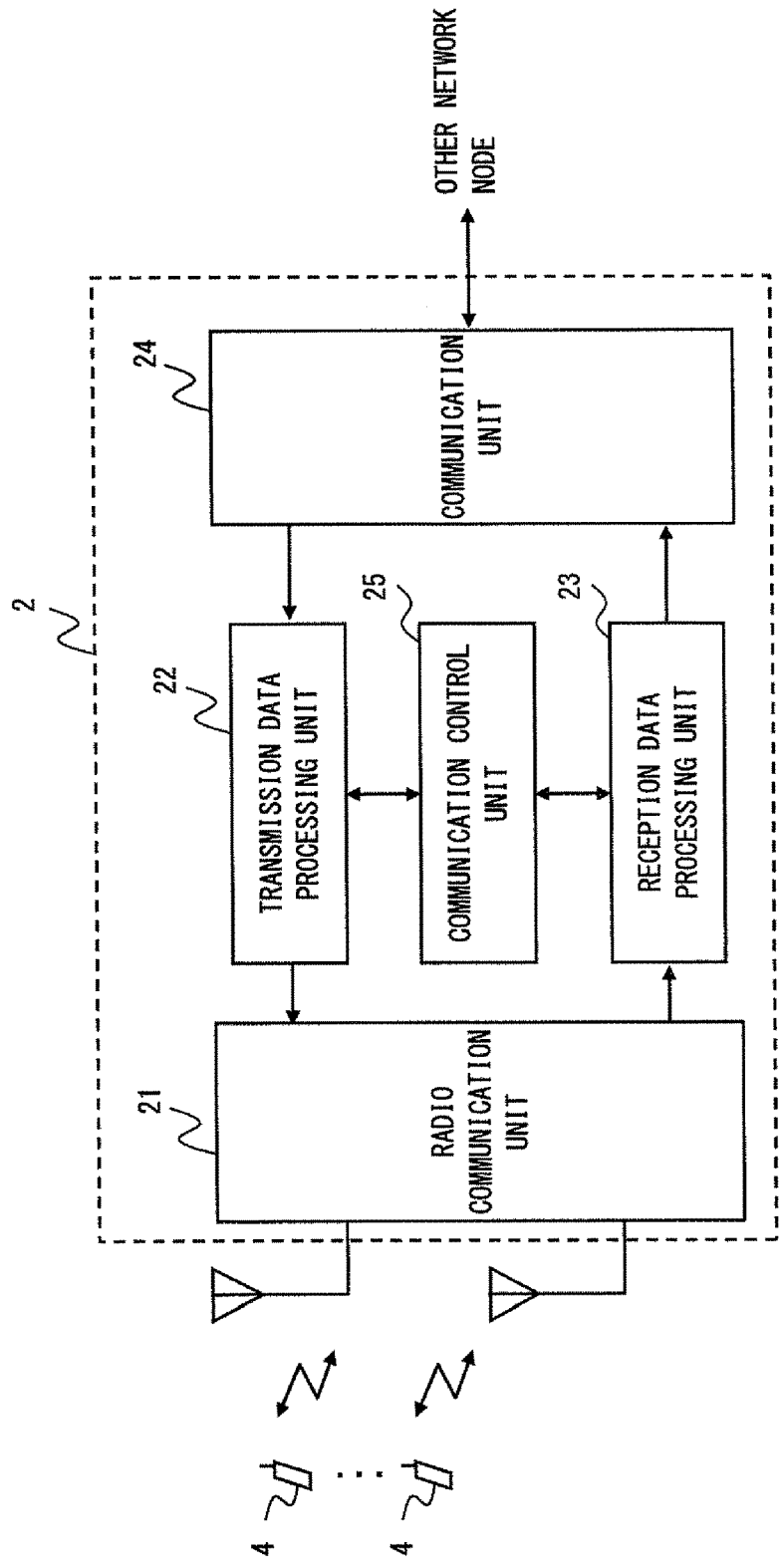
FIG. 3 is a diagram illustrating a configuration example of a second radio station according to the first embodiment.

FIG. 3 is a block diagram illustrating a configuration example of the second radio station 2. The functions and operations of a radio communication unit 21, a transmission data processing unit 22, a reception data processing unit 23, and a communication unit 24 illustrated in FIG. 3 are similar to those of the corresponding elements of the radio station 1 illustrated in FIG. 2, i.e., the radio communication unit 11, the transmission data processing unit 12, the reception data processing unit 13, and the communication unit 14.

A communication control unit 25 of the radio station 2 controls the inter-radio station carrier aggregation which uses the first cell 10 as the PCell and the second cell 20 as the SCell. Further, the communication control unit 25 performs a procedure for changing the PCell of the radio terminal 4 from the first cell 10 to the third cell 30 while keeping the communication status information regarding the radio terminal 4 on the SCell (second cell 20) in the radio network 6 and the radio terminal 4. The communication control unit 25 performs the PCell change procedure in cooperation with the radio station 1, the radio station 3, and the radio terminal 4.

In an example, the communication control unit 25 may operate so as to send the communication status information regarding the radio terminal 4 on the SCell (second cell 20) to the first radio station 1 or the core network 5. Moreover, the communication control unit 25 may request the core network 5 or the first radio station 1 to switch the bearer in the cell 20 (SCell bearer) to the bearer in the cell 10 (PCell bearer). Further, the communication control unit 25 may receive the communication status information regarding the radio terminal 4 on the SCell from the core network 5 or the third radio station 3 after the PCell is changed. In another example, the communication control unit 25 may suspend the provision of a service to the radio terminal 4 in the SCell (second cell 20), keep the communication status information regarding the radio terminal 4 on the SCell (second cell 20), and resume provision of the service suspended in the second cell 20 after the PCell is changed from the first cell 10 to the third cell 30. The details of control and signaling performed by the communication control unit 25 will be described later.

Figure 4:
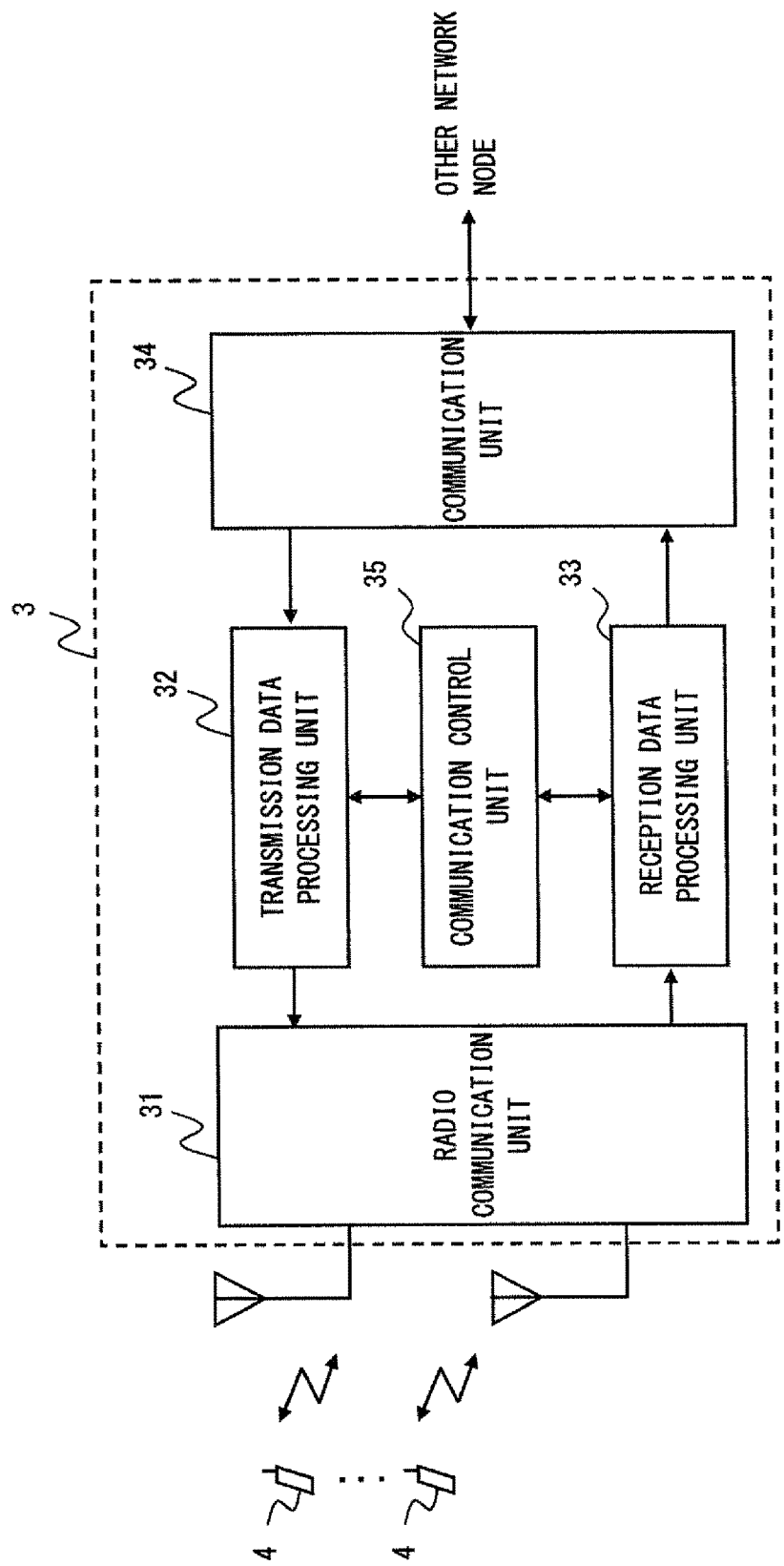
FIG. 4 is a diagram illustrating a configuration example of a third radio station according to the first embodiment.

FIG. 4 is a block diagram illustrating a configuration example of the third radio station 3. The functions and operations of a radio communication unit 31, a transmission data processing unit 32, a reception data processing unit 33, and a communication unit 34 illustrated in FIG. 4 are similar to those of the corresponding elements of the radio station 1 illustrated in FIG. 2, i.e., the radio communication unit 11, the transmission data processing unit 12, the reception data processing unit 13, and the communication unit 14.

The communication control unit 35 of the radio station 3 performs a procedure for changing the PCell of the radio terminal 4 from the first cell 10 to the third cell 30 while keeping the communication status information regarding the radio terminal 4 on the SCell (second cell 20) in the radio network 6 and the radio terminal 4. The communication control unit 35 performs the PCell change procedure in cooperation with the radio station 1, the radio station 2, and the radio terminal 4.

In an example, the communication control unit 35 may receive the communication status information regarding the radio terminal 4 on the SCell (second cell 20) from the first radio station 1. The communication control unit 35 may perform control so as to allow the service, which has been provided in the SCell (second cell 20) before the change of the PCell, to be provided in the PCell after the change (i.e., the third cell 30) based on the communication status information on the SCell. Alternatively, the communication control unit 35 may perform control so as to allow the service, which has been provided in the SCell (second cell 2) before the change of the PCell, to be provided in the second cell again. In this case, the communication control unit 35 may control the inter-radio station carrier aggregation which uses the third cell 30 as the PCell and uses the second cell 20 as the SCell. The details of control and signaling performed by the communication control unit 35 will be described later.

Figure 5:
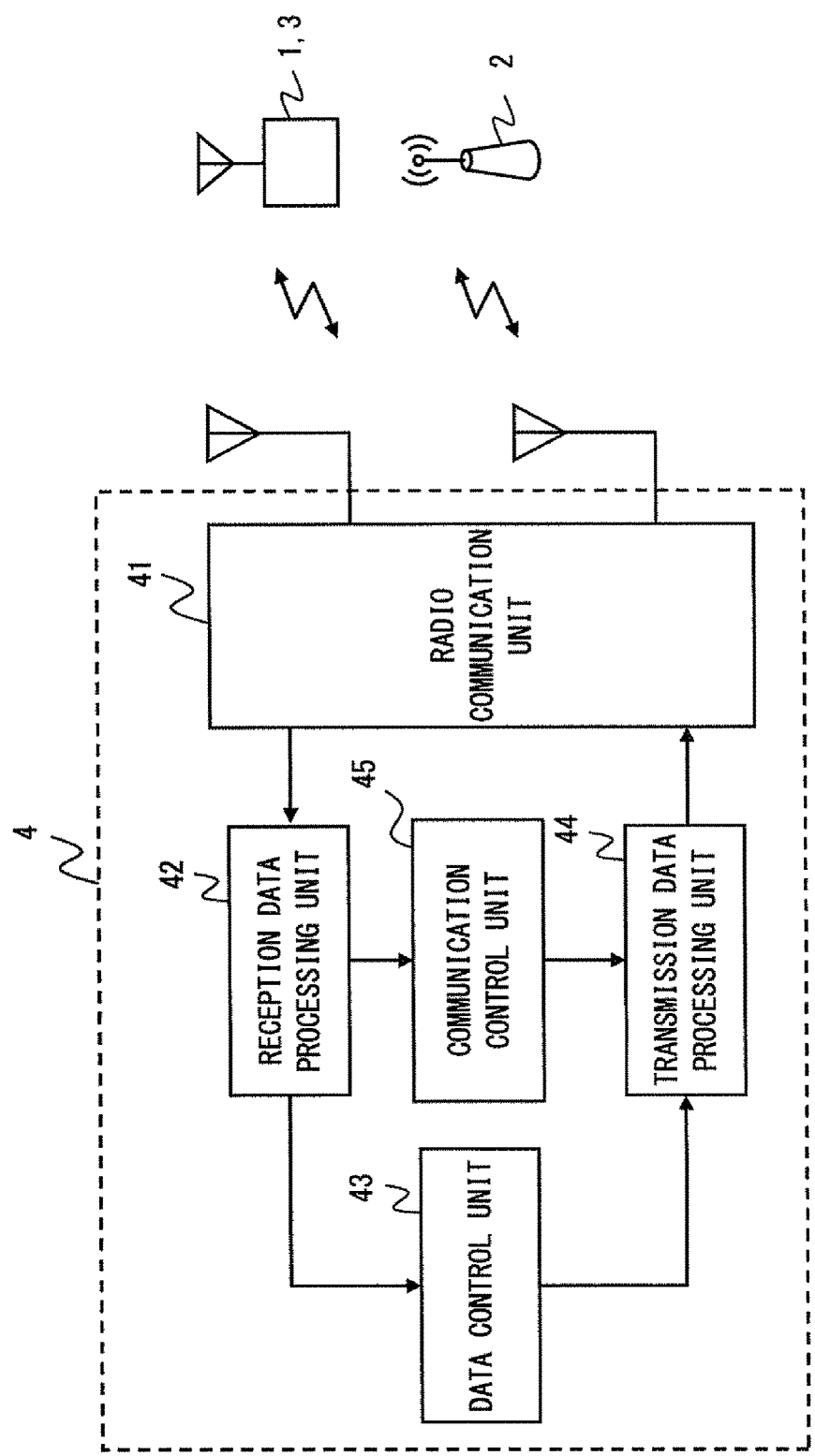
FIG. 5 is a diagram illustrating a configuration example of a radio terminal according to the first embodiment.

FIG. 5 is a block diagram illustrating a configuration example of the radio terminal 4. The radio communication unit 41 supports carrier aggregation on a plurality of cells served by different radio stations and can use the plurality of cells (e.g., the cells 10 and 20) simultaneously in order to transmit or receive user data. Specifically, the radio communication unit 41 receives a downlink signal from the radio station 1, the radio station 2, or the radio station 3 via an antenna. The reception data processing unit 42 restores received data from the received downlink signal, and sends the received data to a data control unit 43. The data control unit 43 uses the received data according to the purpose thereof. A transmission data processing unit 44 and the radio communication unit 41 generate an uplink signal using transmission data supplied from the data control unit 43, and transmit the uplink signal to the radio station 1, the radio station 2, or the radio station 3.

The communication control unit 45 of the radio terminal 4 controls carrier aggregation using a plurality of cells as a PCell and a SCell. For example, the communication control unit 45 controls the inter-radio station carrier aggregation which uses the first cell 10 as the PCell and the second cell 20 as the SCell. Further, the communication control unit 45 performs a procedure for changing the PCell of the radio terminal 4 from the first cell 10 to the third cell 30 while keeping the communication status information regarding the radio terminal 4 on the SCell (second cell 20) in the radio network 6 and the radio terminal 4. The communication control unit 45 performs the PCell change procedure in cooperation with the radio station 1, the radio station 2, and the radio station 3.

In an example, the communication control unit 45 may change the PCell from the first cell 10 to the third cell 30 while keeping the communication status information regarding the radio terminal 4 on the SCell (second cell 20). Specifically, the communication control unit 45 may keep the communication status information regarding the radio terminal 4 on the SCell (second cell 20) without releasing it during the execution of the PCell change procedure (e.g., a handover procedure). After having changed the PCell to the third cell 30, the communication control unit 45 may resume, in the second cell 20 or the third cell 30, the service which has been provided in the SCell (second cell 20) before the change of the PCell. The details of control and signaling performed by the communication control unit 45 will be described later.

Hereinafter, Procedure Examples 1 to 3 of a communication control method in the radio communication system according to this embodiment will be described.

Procedure Example 1

In Procedure Example 1, after a handover of the radio terminal 4 from the first cell 10 to the third cell 30, the radio network 6 resumes, in the third cell 30, the communication (service) which has been provided in the second cell 20 as the SCell before the handover.

Figure 6:
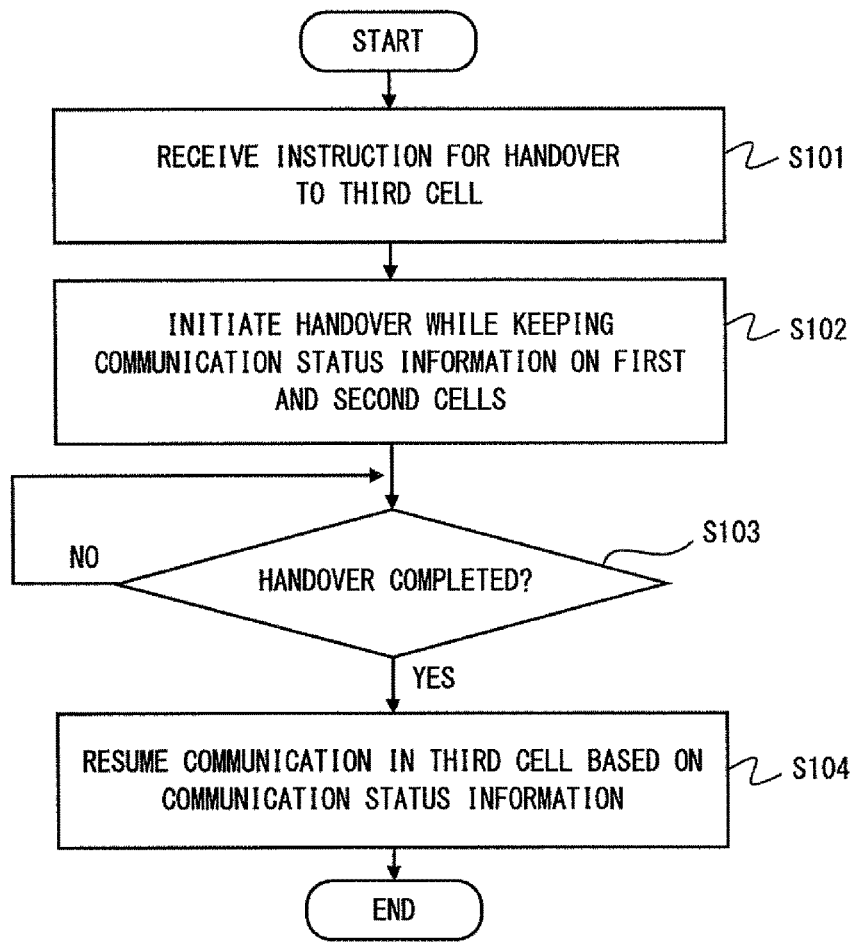
FIG. 6 is a flowchart illustrating an operation example of a radio terminal according to the first embodiment (Procedure Example 1).

FIG. 6 is a flowchart illustrating an example of an operation of the radio terminal 4 according to Procedure Example 1. In step S101, the radio terminal 4 (communication control unit 45) receives from the radio network 6 an instruction to perform a handover to the third cell 30. In step S102, the radio terminal 4 (communication control unit 45) initiates a handover to the cell 30 while keeping the communication status information on the cells 10 and 20. When the handover is completed (YES in step S103), the radio terminal 4 (communication control unit 45) resumes the communication of the radio terminal 4 in the cell 30 based on the kept communication status information on the cells 10 and 20. The resumed communication includes a communication which has been performed in the SCell (cell 20) before the change of the PCell.

Figure 7:
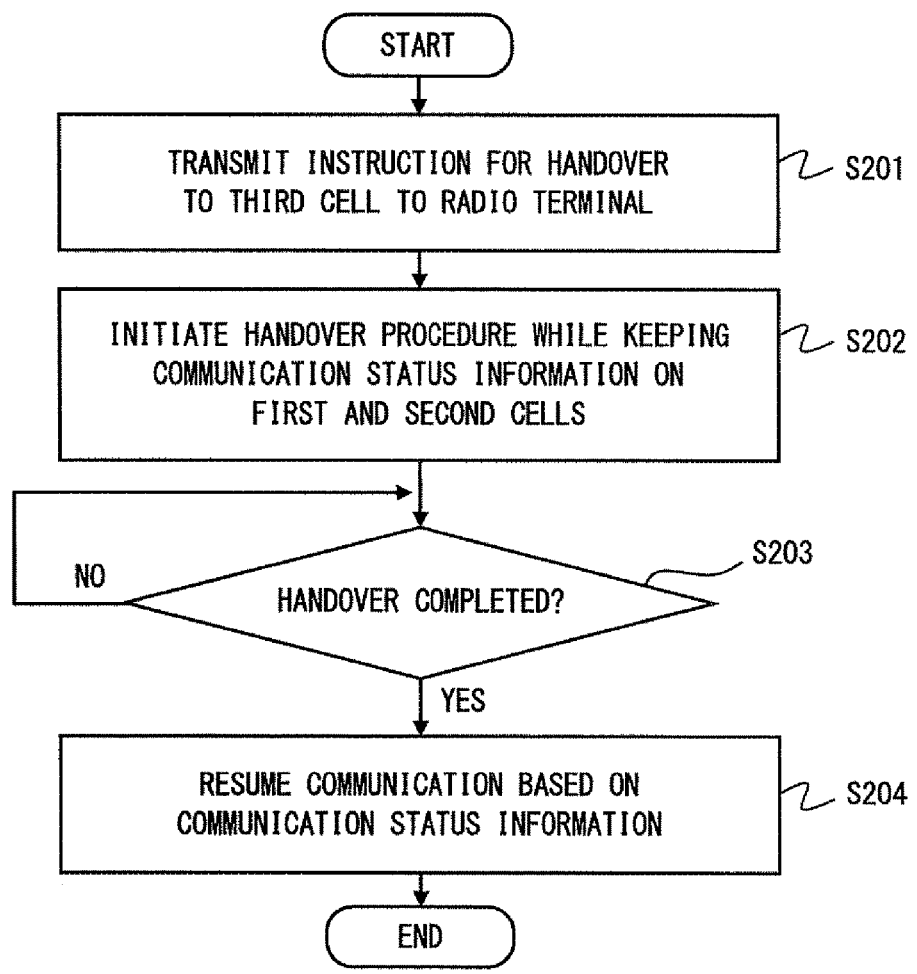
FIG. 7 is a flowchart illustrating an operation example of a radio network according to the first embodiment (Procedure Example 1).

FIG. 7 is a flowchart illustrating an example of an operation of the radio network 6 according to Procedure Example 1. In step S201, the radio network 6 (e.g., the communication control unit 15 of the radio station 1) transmits, to the radio terminal 4, an instruction to perform a handover to the third cell 30. In step S202, while keeping the communication control information regarding the radio terminal 4 on the cells 10 and 20, the radio network 6 (e.g., the communication control unit 15 of the radio station 1, the communication control unit 25 of the radio station 2, and the communication control unit 35 of the radio station 3) initiates a handover procedure of the radio terminal 4 from the cell 10 to the cell 30. When the handover is completed (YES in step S203), the radio network 6 (communication control unit 35) performs communication with the radio terminal 4 in the cell 30 based on the kept communication status information regarding the radio terminal 4 on the cells 10 and 20. That is, the radio network 6 resumes the communication. The resumed communication includes a communication which has been performed in the SCell (cell 20) before the change of the PCell.

Figure 8:
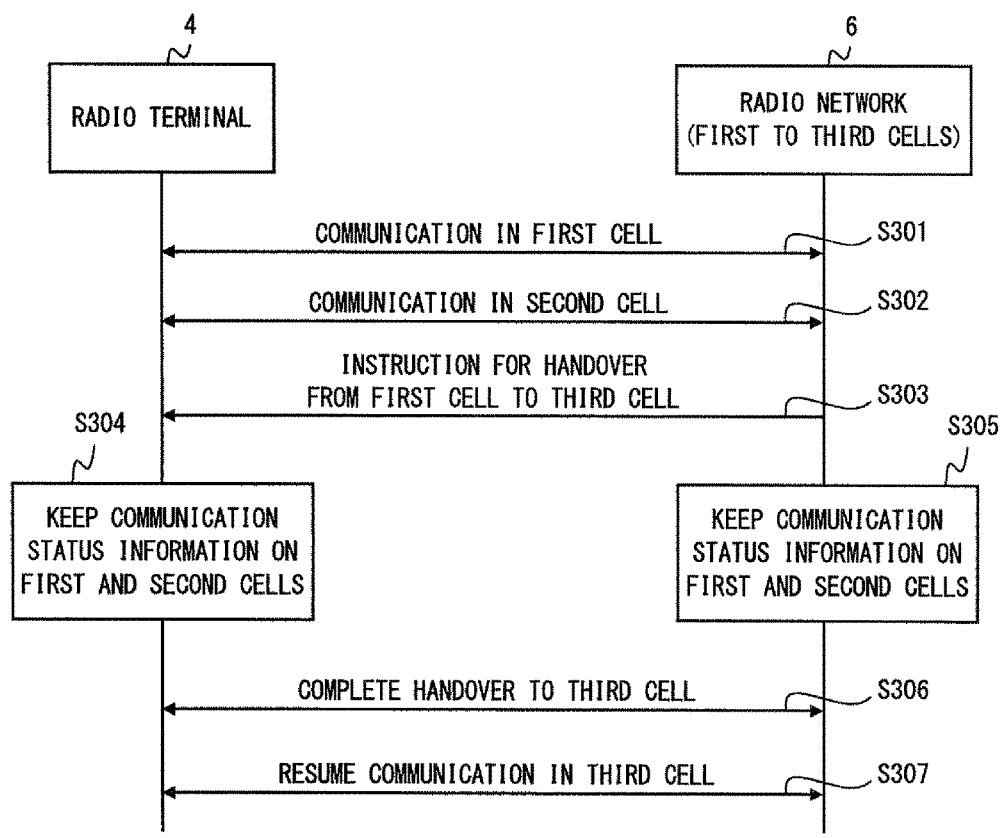
FIG. 8 is a sequence diagram illustrating an example of a communication control method in the radio communication system according to the first embodiment (Procedure Example 1).

FIG. 8 is an example of a sequence diagram illustrating the entire process of Procedure Example 1. In steps S301 and S302, the radio network 6 and the radio terminal 4 performs communication (inter-radio station carrier aggregation) using the first cell 10 as the PCell and the second cell 20 as the SCell. In step S303, the radio network 6 transmits, to the radio terminal 4, an instruction to perform a handover from the cell 10 to the cell 30. In step S304, the radio terminal 4 initiates the handover to the cell 30 while keeping the communication status information on the cells 10 and 20. The radio network 6 also keeps the communication status information regarding the radio terminal 4 on the cells 10 and 20 during the handover of the radio terminal 4 (step S305). In step S306, the radio network 6 and the radio terminal 4 complete the handover of the radio terminal 4 from the cell 10 to the cell 30. In step S307, the radio network 6 and the radio terminal 4 resume the communication of the radio terminal 4 in the cell 30 based on the kept communication status information regarding the radio terminal 4 on the cells 10 and 20. The resumed communication includes a communication which has been performed in the SCell (cell 20) before the change of the PCell.

In Procedure Example 1 described above, the first radio station 1 (communication control unit 15) may explicitly inform the radio terminal 4 to keep the communication status information on the second cell 20 (or to perform a handover while keeping the communication status information). This notification may be transmitted together with a message of an instruction to perform a handover from the first cell 10 to the third cell 30 or may be transmitted using a message different from the handover instruction. Moreover, the first radio station 1 (communication control unit 15) may inform the radio terminal 4 to release a bearer (SCell bearer) in the cell 20 or to maintain the SCell bearer.

Modification of Procedure Example 1

In a modification of Procedure Example 1, after a handover of the radio terminal 4 from the first cell 10 to the third cell 30, the radio network 6 resumes, in the second cell 20, the communication (service) which has been provided in the second cell 20 as the SCell before the handover. That is, the third radio station 3 uses the second cell 20 as a SCell after the handover to change the PCell of the radio terminal 4 to the third cell 30 is performed.

Figure 9:
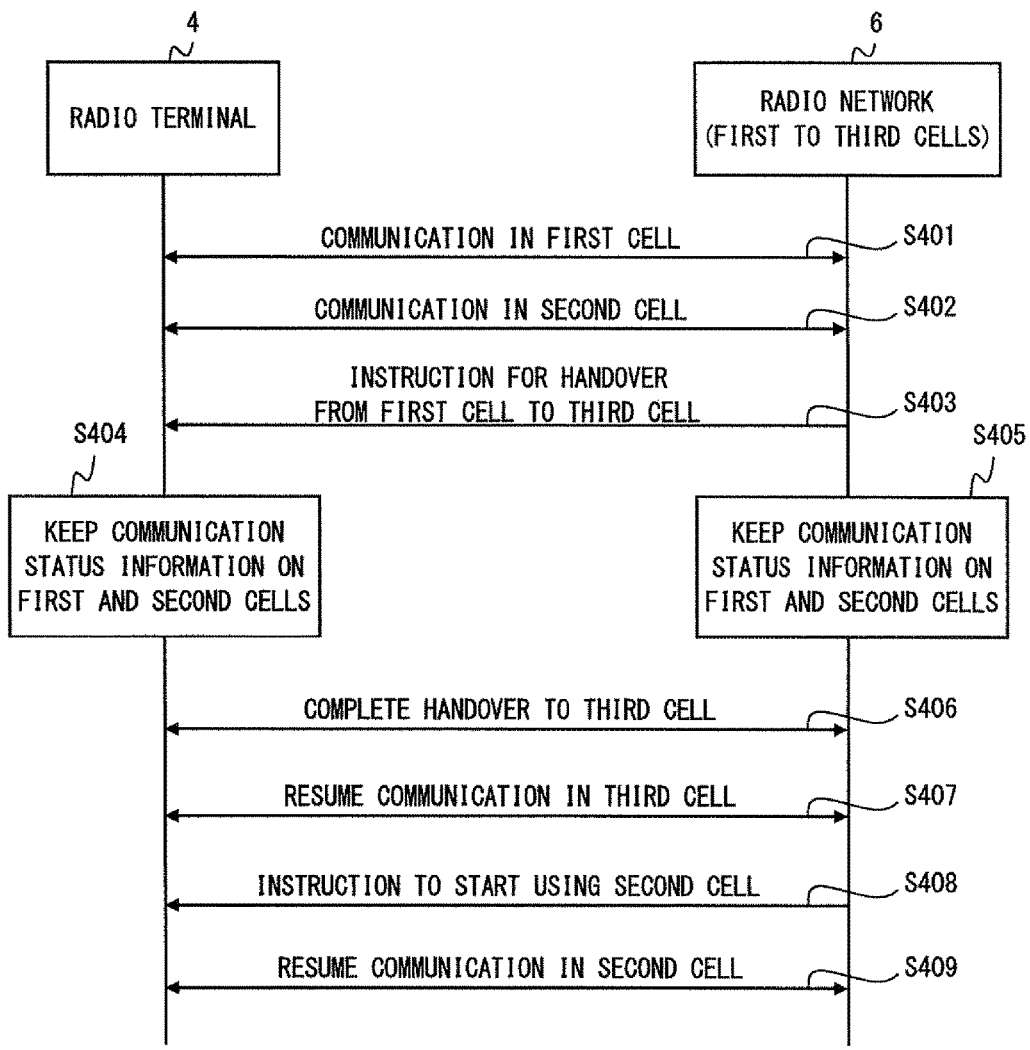
FIG. 9 is a sequence diagram illustrating another example of the communication control method in the radio communication system according to the first embodiment (Modification of Procedure Example 1).

FIG. 9 is a sequence diagram illustrating the entire process of the modification of the Procedure Example 1. The processes of steps S401 to S407 of FIG. 9 are similar to the processes of steps S301 to S307 illustrated in FIG. 8. In step S408, after changing the PCell of the radio terminal 4, the radio network 6 (e.g., the communication control unit 35 of the radio station 3) transmits, to the radio terminal 4, an instruction to start using the second cell 20. Instead of this, the radio network 6 (e.g., the communication control unit 35 of the radio station 3) may transmit, to the radio terminal 4, an instruction to resume the communication in the cell 20. In this way, in step S409, the radio network 6 and the radio terminal 4 can resume, in the cell 30, the communication which has been performed in the cell 10 before the change of the PCell, and resume, in the cell 20, the communication which has been performed in the cell 20 before the change of the PCell.

After the change (i.e., the handover) of the PCell of the radio terminal 4, the radio network 6 may transmit, to the radio terminal 4, radio resource configuration information regarding the second cell 20 in order to start using the second cell 20. Moreover, the transmission of the radio resource configuration information regarding the second cell 20 may indicate the instruction to start using the second cell from the radio network 6 to the radio terminal 4. Instead of this, the radio network 6 may transmit to the radio terminal 4 an activation message indicating activation of the second cell 20 separately from the radio resource configuration information regarding the second cell 20.

Procedure Example 2

Figure 10:
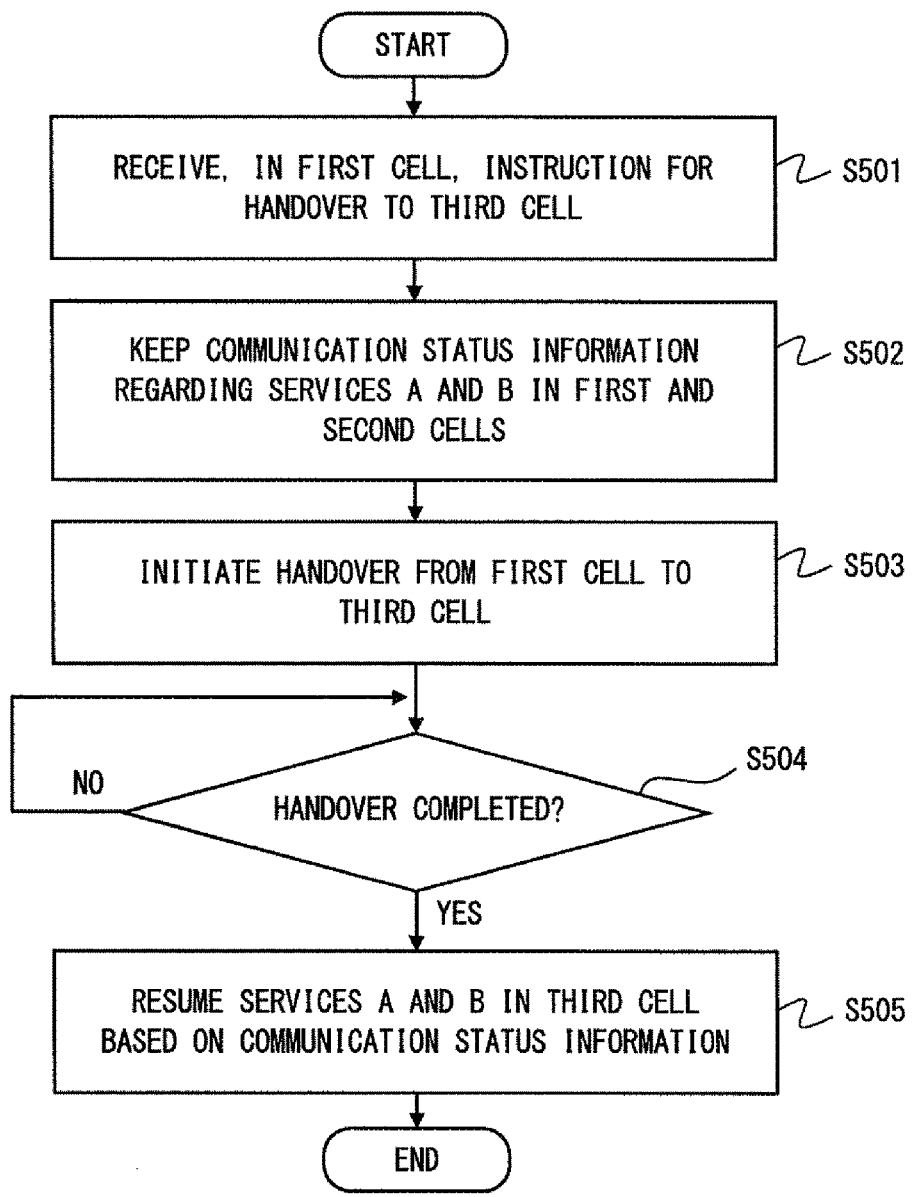
FIG. 10 is a flowchart illustrating an operation example of the radio terminal according to the first embodiment (Procedure Example 2).

Procedure Example 2 corresponds to a more specific example of Procedure Example 1 described above. FIG. 10 is a flowchart illustrating an example of the operation of the radio terminal 4 according to Procedure Example 2. In step S501, the radio terminal 4 (communication control unit 45) receives, on the first cell 10 from the first radio station 1, an instruction to perform a handover to the third cell 30. In step S502, the radio terminal 4 (communication control unit 45) keeps the communication status information regarding the communication (service A) provided in the PCell (first cell 10) and the communication (service B) provided in the SCell (second cell 20). In step S503, the radio terminal 4 (communication control unit 45) initiates a handover from the first cell 10 to the third cell 30. When the handover is completed (YES in step S504), the radio terminal 4 (communication control unit 45) resumes the services A and B in the cell 30 based on the kept communication status information on the cells 10 and 20.

Figure 11:
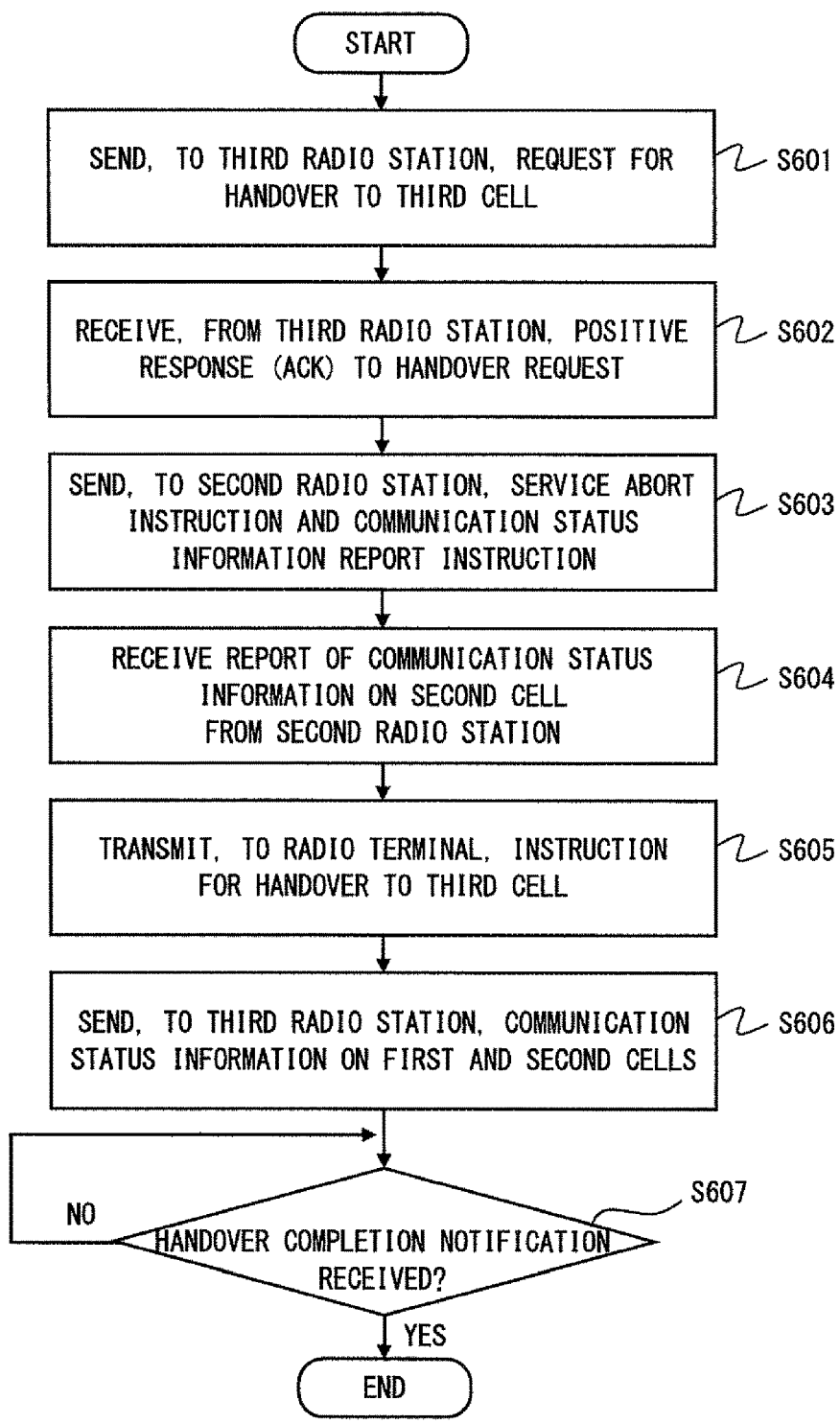
FIG. 11 is a flowchart illustrating an operation example of the first radio station according to the first embodiment (Procedure Example 2).

FIG. 11 is a flowchart illustrating an example of the operation of the first radio station 1 according to Procedure Example 2. In step S601, the radio station 1 (communication control unit 15) sends, to the radio station 3, a handover request indicating a handover of the radio terminal 4 to the third cell 30. In step S602, the radio station 1 (communication control unit 15) receives from the radio station 3 a positive response (ACK) to the handover request. In step S603, the radio station 1 (communication control unit 15) sends, to the radio station 2, an instruction to abort the service for the radio terminal 4 and an instruction to report the communication status information regarding the radio terminal 4. In step S604, the radio station 1 (communication control unit 15) receives, from the radio station 2, the report of the communication status information regarding the radio terminal 4 on the second cell 20. In step S605, the radio station 1 (communication control unit 15) transmits, to the radio terminal 4, an instruction to perform a handover to the third cell 30. In step S606, the radio station 1 (communication control unit 15) sends, to the radio station 3, the communication status information regarding the radio terminal 4 on the first cell 10 managed by itself and the communication status information regarding the radio terminal 4 on the second cell 20 received from the radio station 2. In step S607, the radio station 1 (communication control unit 15) ends the process of FIG. 11 in response to receiving a handover completion notification from the radio station 3.

Figure 12:
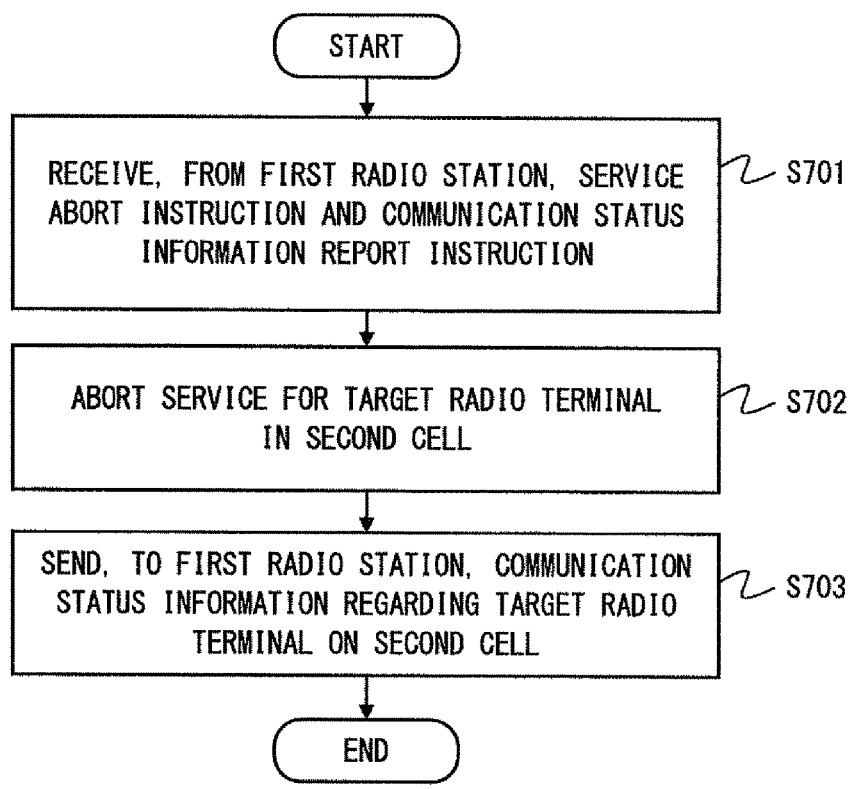
FIG. 12 is a flowchart illustrating an operation example of the second radio station according to the first embodiment (Procedure Example 2).

FIG. 12 is a flowchart illustrating an example of the operation of the second radio station 2 according to Procedure Example 2. In step S701, the radio station 2 (communication control unit 25) receives, from the radio station 1, the instruction to abort the service for a target radio terminal (i.e., the radio terminal 4) and the instruction to report the communication status information regarding the radio terminal 4. In step S702, the radio station 2 (communication control unit 25) aborts the provision of the service to the radio terminal 4 in the second cell 20. In step S703, the radio station 2 (communication control unit 25) sends, to the radio station 1, the communication status information regarding the radio terminal 4 on the second cell 20.

Figure 13:
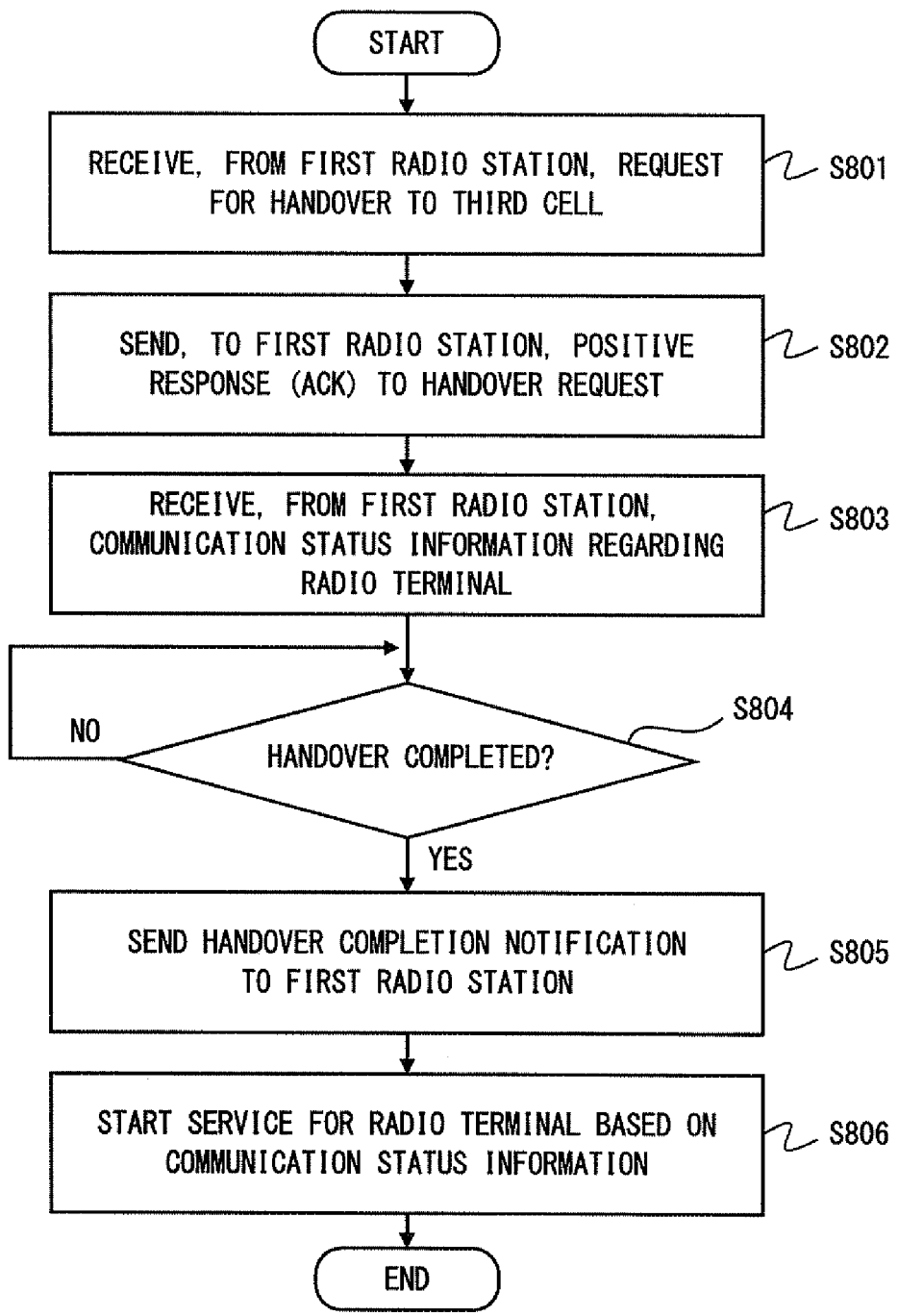
FIG. 13 is a flowchart illustrating an operation example of the third radio station according to the first embodiment (Procedure Example 2).

FIG. 13 is a flowchart illustrating an example of the operation of the third radio station 3 according to Procedure Example 2. In step S801, the radio station 3 (communication control unit 35) receives, from the radio station 1, a handover request indicating a handover of the radio terminal 4 to the third cell 30. In step S802, the radio station 3 (communication control unit 35) sends, to the radio station 1, a positive response (ACK) to the handover request. In step S803, the radio station 3 (communication control unit 35) receives, from the radio station 1, the communication status information regarding the radio terminal 4 on the cells 10 and 20. In step S804, the radio station 3 (communication control unit 35) performs a handover procedure of the radio terminal 4. When the handover is completed (Yes in step S804), the radio station 3 (communication control unit 35) sends a handover completion notification to the radio station 1 (step S805). In step S806, the radio station 3 (communication control unit 35) resumes the services A and B in the third cell 30 based on the communication status information regarding the radio terminal 4 on the cells 10 and 20.

Figure 14:
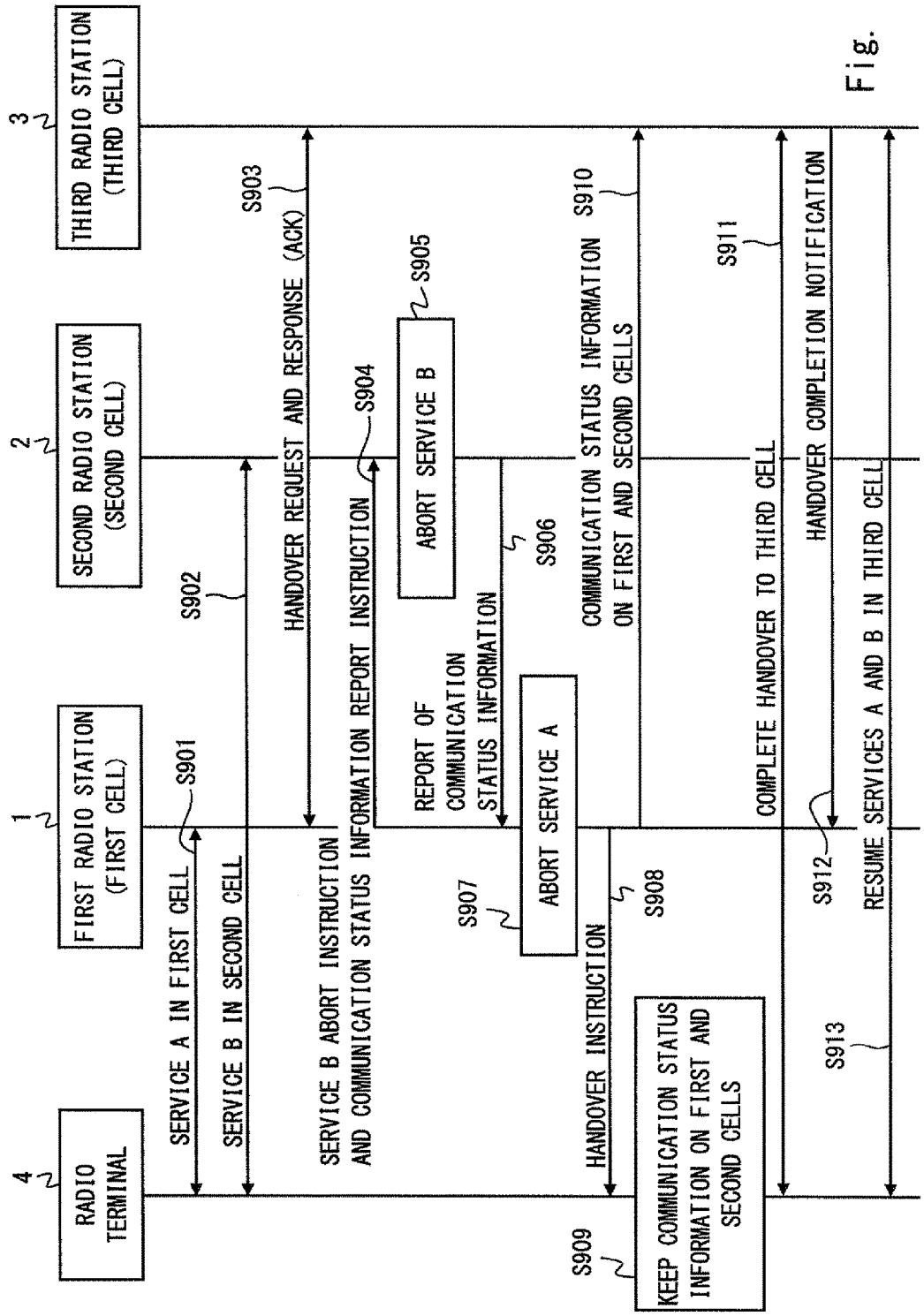
FIG. 14 is a sequence diagram illustrating an example of the communication control method in the radio communication system according to the first embodiment (Procedure Example 2).

FIG. 14 is an example of a sequence diagram illustrating the entire process of Procedure Example 2. In step S901, the radio station 1 and the radio terminal 4 performs communication (service A) using the first cell 10 as the PCell. In step S902, the radio station 2 and the radio terminal 4 performs communication (service B) using the second cell 20 as the SCell. In step S903, the radio station 1 sends a handover request to the radio station 3, and receives a response (ACK) to the handover request from the radio station 3. In step S904, the radio station 1 sends, to the radio station 2, an instruction to abort the service B and an instruction to report the communication status information. In step S905, in response to the service abort instruction, the radio station 2 aborts the service B for the radio terminal 4 in the SCell (second cell 20). In step S906, in response to the instruction to report the communication status information, the radio station 2 reports to the radio station 1 the communication status information regarding the radio terminal 4 on the second cell 20.

In step S907, the radio station 1 aborts the service A in the PCell (first cell 10). In step S908, the radio station 1 transmits a handover instruction to the radio terminal 4. In step S909, the radio terminal 4 performs a handover from the cell 10 to the cell 30 while keeping the communication status information on the cells 10 and 20. In step S910, the radio station 1 sends, to the radio station 3, the communication status information regarding the radio terminal 4 on the cells 10 and 20. In step S911, the radio station 3 and the radio terminal 4 complete the handover. In step S912, the radio station 3 sends a handover completion notification to the radio station 1. In step S913, the radio station 3 and the radio terminal 4 resumes, in the cell 30, the communication (services A and B) which has been performed in the cells 10 and 20 before the handover.

In Procedure Example 2 described above, the radio station 1 may sends only the instruction to abort the service B to the radio station 2 instead of sending both the instruction to abort the service B and the instruction to report the communication status of the radio terminal 4. In this case, the radio station 1 sends only the communication status information on the first cell to the radio station 3. Further, in this case, the radio station 3 may send, to the radio station 2, an instruction to report the communication status of the radio terminal 4. For example, the radio station 3 may send this instruction after receiving the communication status on the first cell from the radio station 1, or before or after sending the handover completion notification to the radio station 1.

Procedure Example 3

In Procedure Example 3, the second radio station 2 temporarily suspends the communication (service B) in the second cell 20 and resumes the communication (service B) which has been suspended in the second cell 20 after the PCell of the radio terminal 4 is changed from the first cell 10 to the third cell 30. Specifically, the third radio station 3 transmits, to the radio terminal 4, an instruction to resume communication (to resume service) in the second cell 20 after completion of the handover of the radio terminal 4. The third radio station 3 may transmit either one or both of radio resource configuration information and radio resource control information on the second cell 20 together with or instead of an instruction to start using the second cell 20 or an instruction to resume communication (to resume service).

Figure 15:
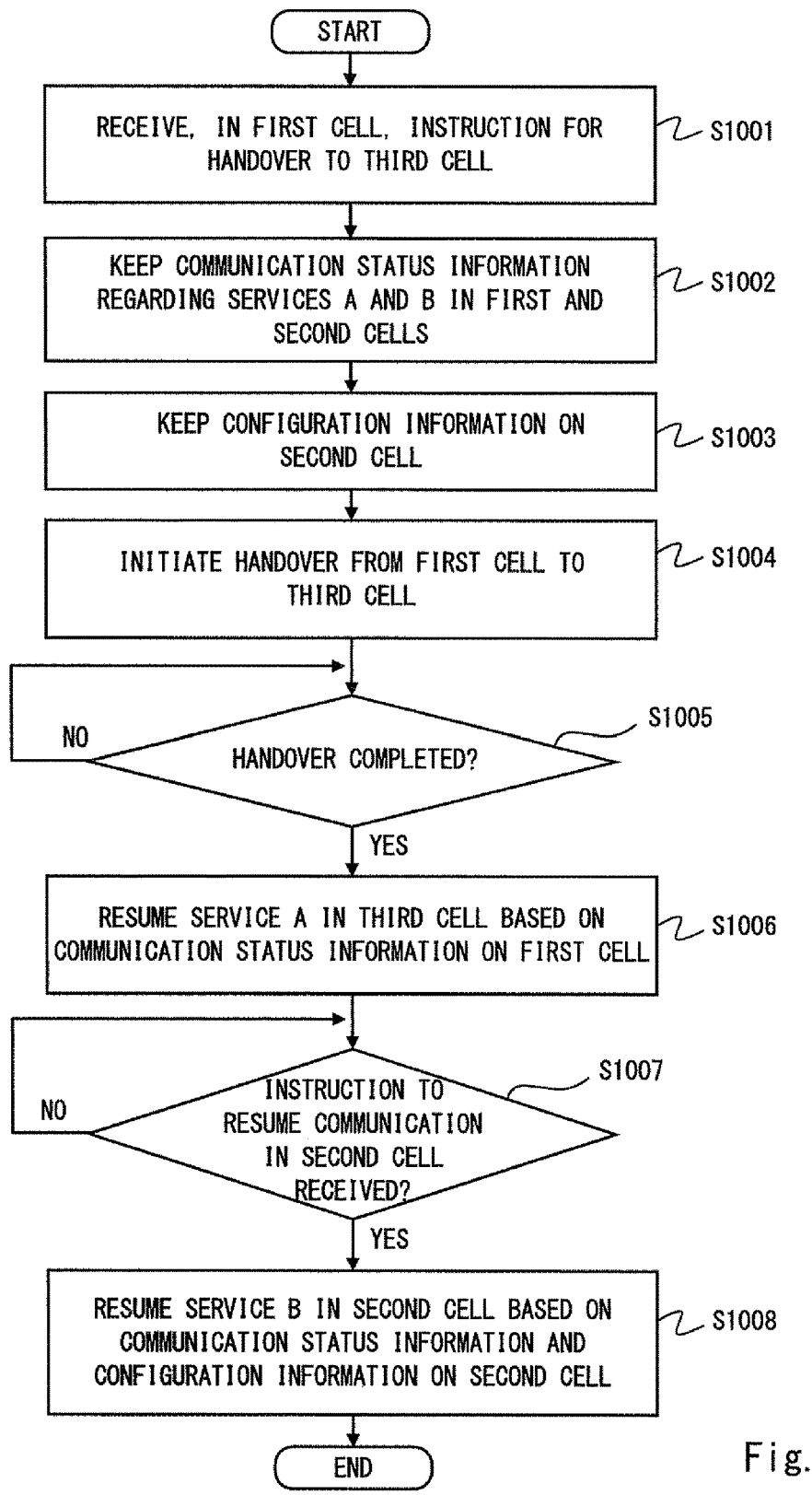
FIG. 15 is a flowchart illustrating an operation example of the radio terminal according to the first embodiment (Procedure Example 2).

FIG. 15 is a flowchart illustrating an example of the operation of the radio terminal 4 according to Procedure Example 3. The processes of steps S1001 to S1002 illustrated in FIG. 15 are similar to the processes of steps S501 to S502 illustrated in FIG. 10. In step S1003, the radio terminal 4 (communication control unit 45) keeps configuration information (e.g., radio resource configuration information) of the second cell 20. The processes of steps S1004 to S1005 are similar to the processes of steps S503 to S504 illustrated in FIG. 10. In step S1006, the radio terminal 4 (communication control unit 45) resumes the service A in the third cell 30 based on the communication status information on the first cell 10. In step S1007, the radio terminal 4 (communication control unit 45) determines whether an instruction to resume communication in the second cell 20 has been received from the radio station 3. When the instruction to resume communication has been received (YES in step S1007), the radio terminal 4 (communication control unit 45) resumes the service B in the second cell 20 based on the communication status information and the configuration information on the second cell 20 (step S1008).

Figure 16:
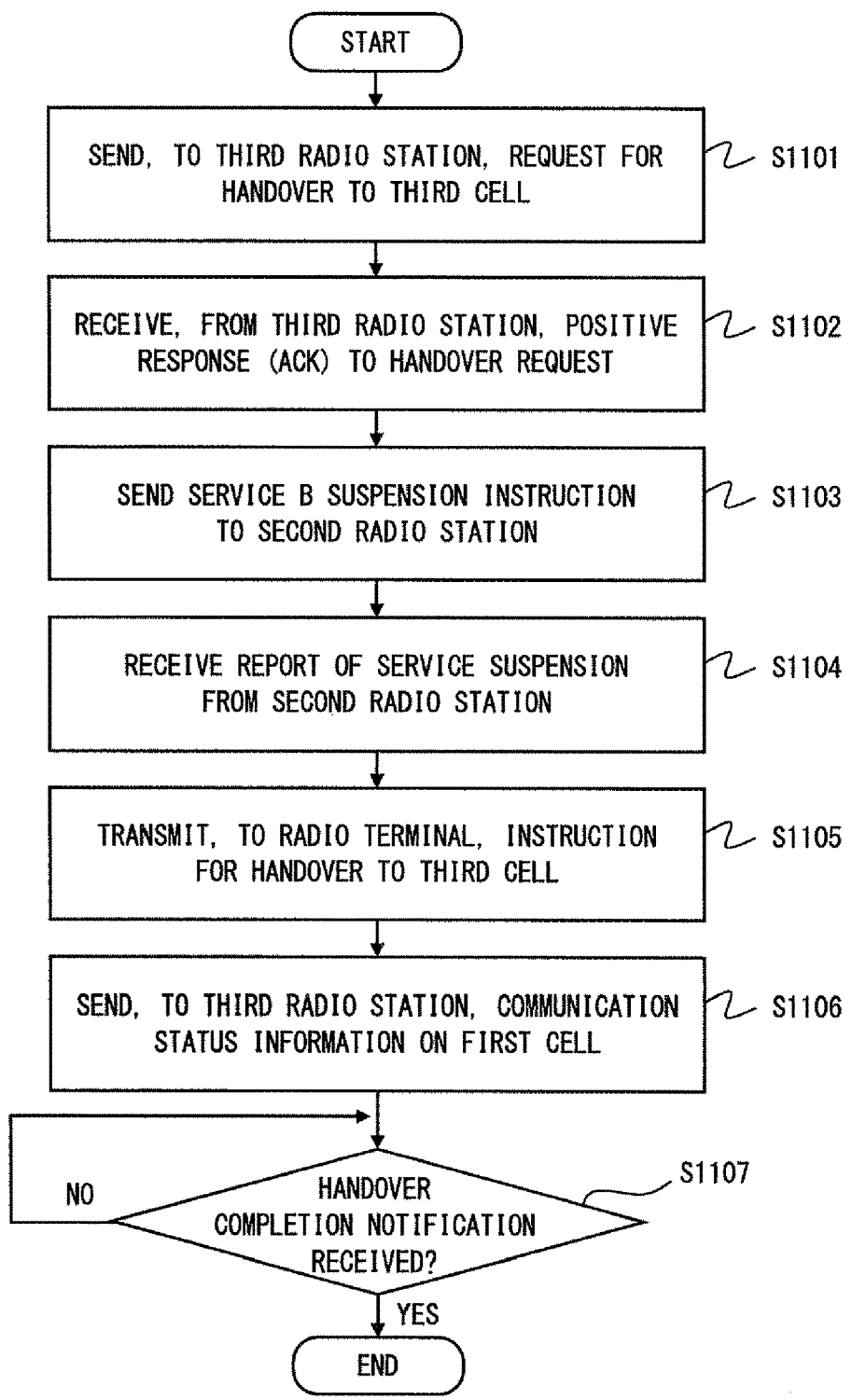
FIG. 16 is a flowchart illustrating an operation example of the first radio station according to the first embodiment (Procedure Example 2).

FIG. 16 is a flowchart illustrating an example of the operation of the radio station 1 according to Procedure Example 3. The processes of steps S1101, S1102, S1105, and S1107 illustrated in FIG. 16 are similar to the processes of steps S601, S602, S605, and S607 illustrated in FIG. 11. In step S1103, after receiving a positive response (ACK) to the handover request, the radio station 1 (communication control unit 15) sends, to the radio station 2, an instruction to suspend the service B. In step S1104, the radio station 1 (communication control unit 15) receives the report of the service suspension from the radio station 2. In step S1106, the radio station 1 sends to the radio station 3 the communication status information on the PCell (first cell 10) managed by itself. Since the communication status information on the SCell (second cell 20) is kept in the radio station 2, the radio station 1 may not send the communication status information on the SCell to the radio station 3.

Figure 17:
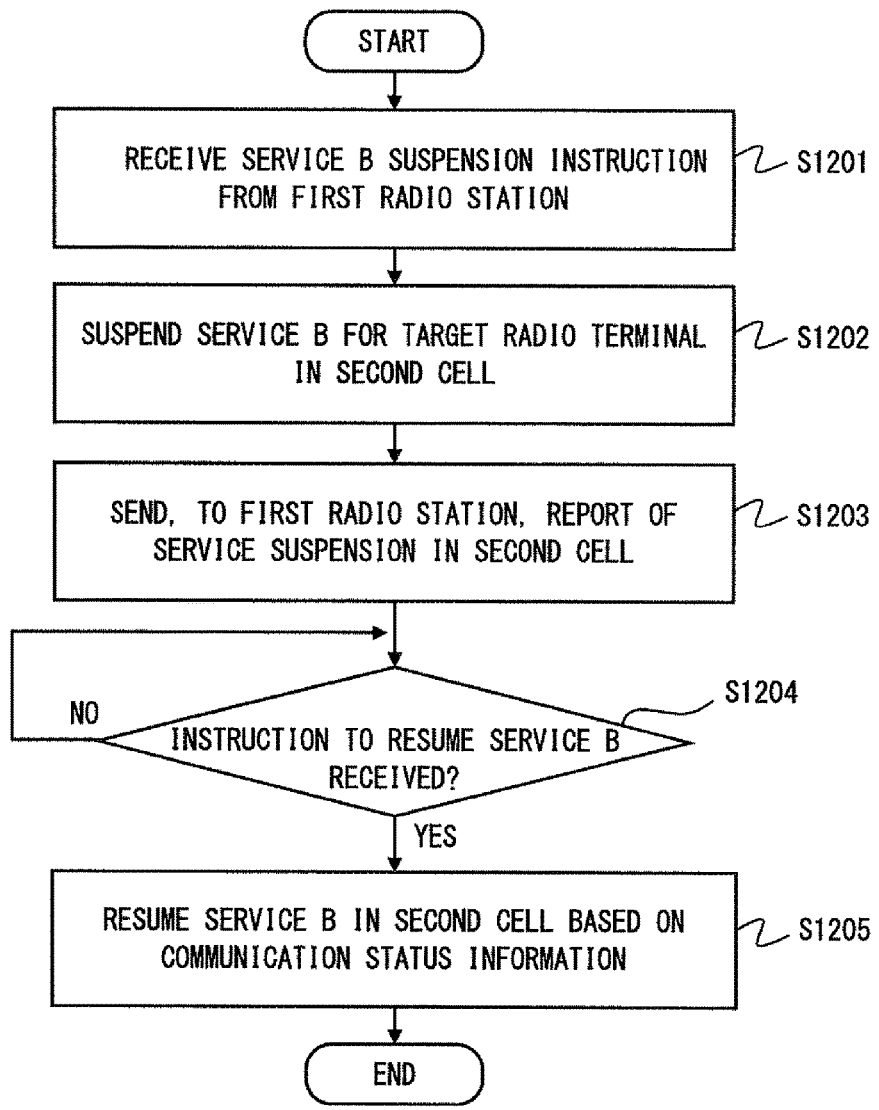
FIG. 17 is a flowchart illustrating an operation example of the second radio station according to the first embodiment (Procedure Example 2).

FIG. 17 is a flowchart illustrating an example of the operation of the radio station 2 according to Procedure Example 3. In step S1201, the radio station 2 (communication control unit 25) receives from the radio station 1 an instruction to suspend the service B. In step S1202, the radio station 2 (communication control unit 25) suspends the service B for the target radio terminal (i.e., the radio terminal 4) in the second cell 20 in response to the suspension instruction. In step S1203, the radio station 2 (communication control unit 25) sends the report of the suspension of the service B in the second cell 20 to the radio station 1. In step S1204, the radio station 2 (communication control unit 25) determines whether an instruction to resume the service B has been received from the radio station 3. When the instruction to resume has been received (YES in step S1204), the radio station 2 (communication control unit 25) resumes the service B in the second cell 20 based on the communication status information regarding the radio terminal 4 on the cell 20 managed by itself.

Figure 18:
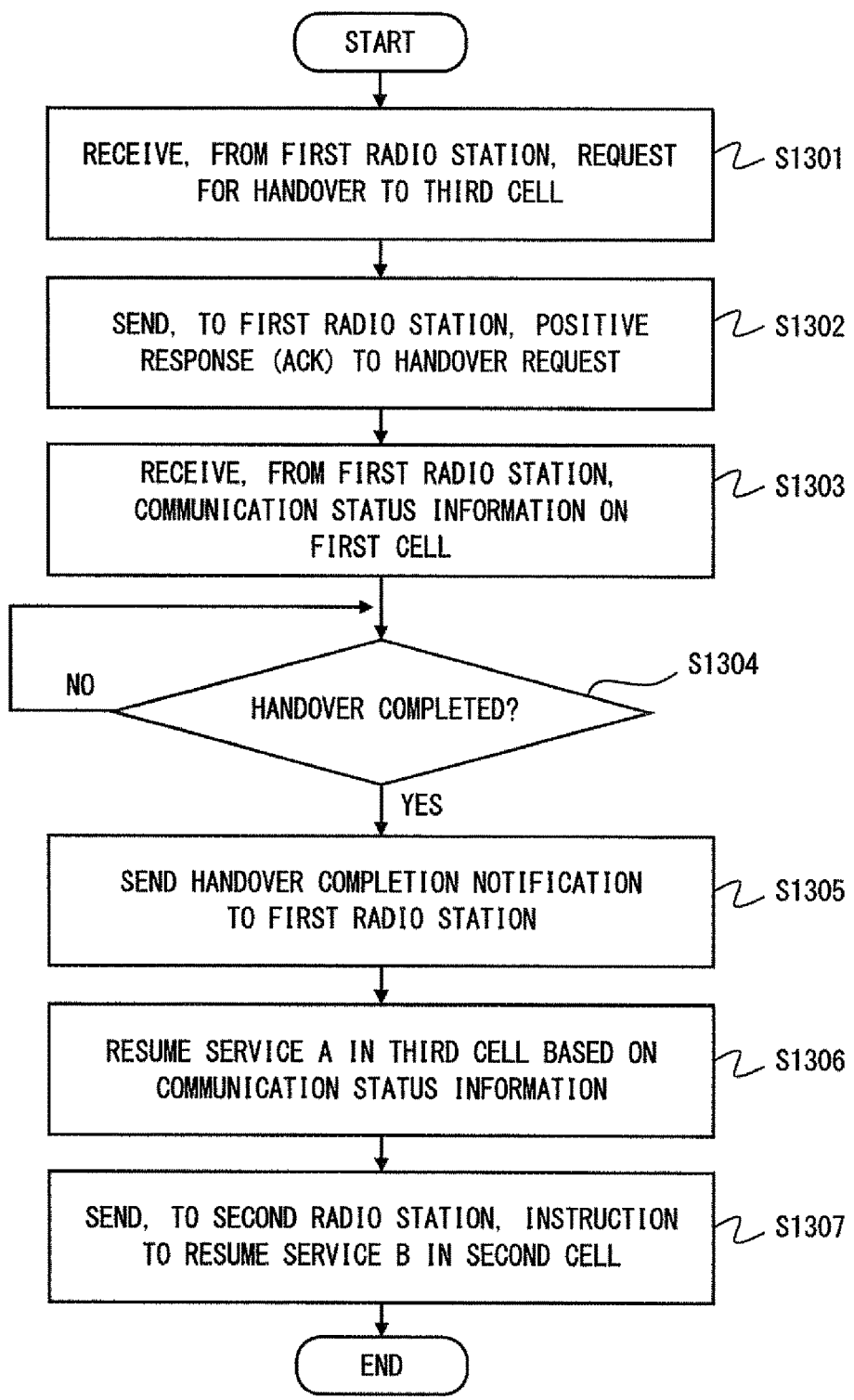
FIG. 18 is a flowchart illustrating an operation example of the third radio station according to the first embodiment (Procedure Example 2).

FIG. 18 is a flowchart illustrating an example of the operation of the radio station 3 according to Procedure Example 3. The processes of steps S1301 to S1305 illustrated in FIG. 18 are similar to the processes of steps S801 to S805 illustrated in FIG. 13. In step S1306, the radio station 3 (communication control unit 35) resumes the service A in the third cell 30 based on the communication status information regarding the radio terminal 4 on the cell 10. In step S1307, the radio station 3 (communication control unit 35) sends, to the radio station 2, an instruction to resume the service B for the radio terminal 4 in the second cell 20.

Figure 19:
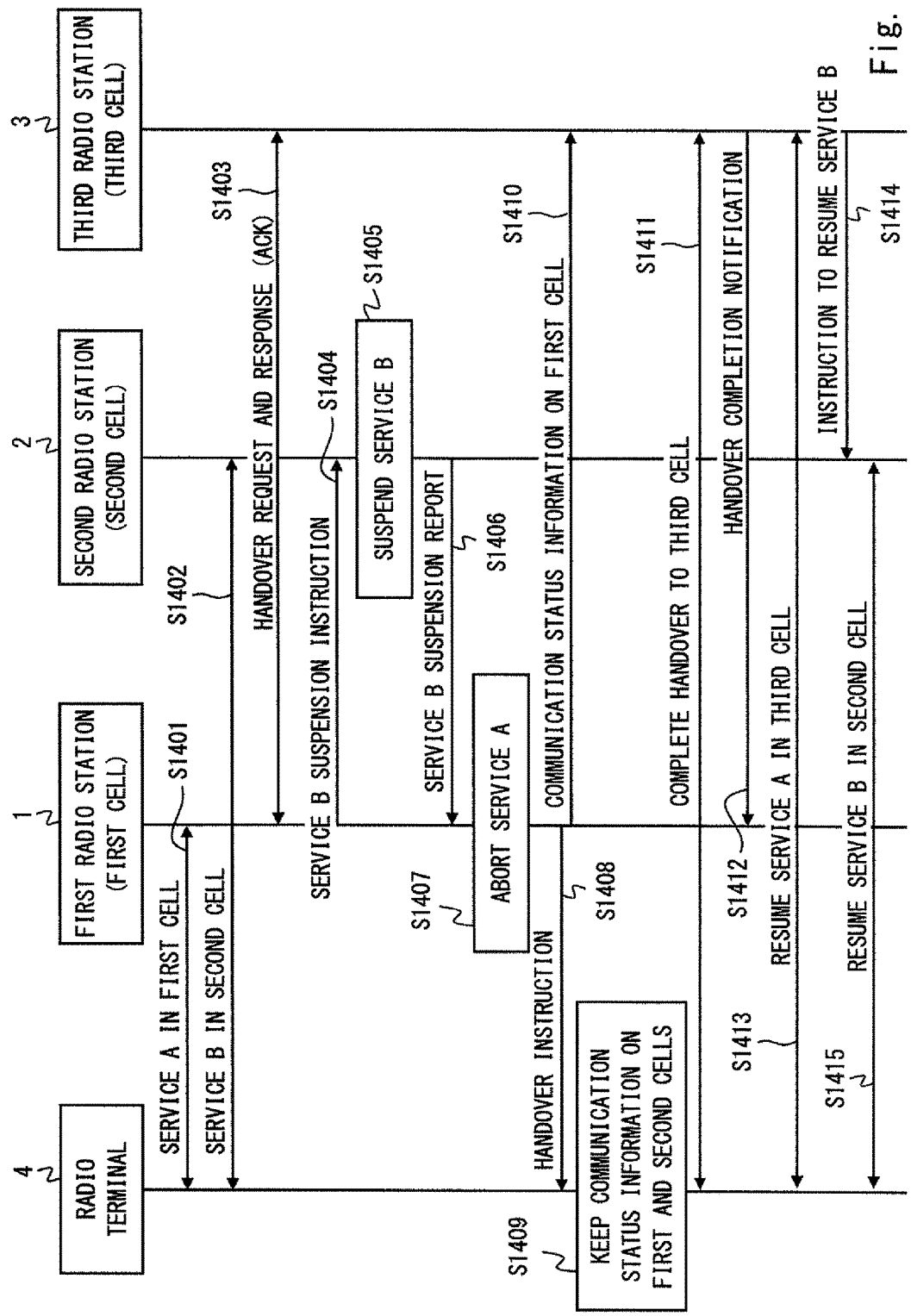
FIG. 19 is a sequence diagram illustrating an example of the communication control method in the radio communication system according to the first embodiment (Procedure Example 3).

FIG. 19 illustrates an example of a sequence diagram illustrating the entire process of Procedure Example 3. The processes of steps S1401 to S1403 illustrated in FIG. 19 are similar to the processes of steps S901 to S903 of FIG. 14 according to Procedure Example 2. In step S1404 of FIG. 19, the radio station 1 sends to the radio station 2 an instruction to suspend the service B instead of an instruction to abort the service B. Moreover, it is not necessary to transmit an instruction to report the communication status information. The radio station 2 suspends the service B in response to the suspension instruction (step S1405) and sends the report of the service suspension to the radio station 1 (step S1406). After step S1406, the processes of steps S1407 to S1409 similar to the processes of steps S907 to S909 of FIG. 14 are performed.

In step S1410 of FIG. 19, the radio station 1 sends to the radio station 3 the communication status information regarding the radio terminal 4 on the PCell (first cell 10). It is not necessary to send the communication status information regarding the radio terminal 4 on the SCell (second cell 20). After step S1410, the processes of steps S1411 and S1412 similar to the processes of steps S911 and S912 of FIG. 14 are performed. In step S1413 of FIG. 19, the radio station 3 and the radio terminal 4 resume the service A of the PCell in the third cell 30. In step S1414, the radio station 3 sends, to the radio station 2, an instruction to resume the service B of the SCell. In step S1415, the radio station 2 and the radio terminal 4 resume the service B of the SCell in the second cell 20.

The communication (service) performed by the radio terminal 4 in Procedure Examples 1 to 3 described above may be data communication (User plane (U-plane)) or may be control-plane signaling (Control plane (C-plane)).

In Procedure Examples 1 to 3 described above, exchange of messages and information between radio stations may be performed through the core network 5.

In Procedure Example 1 described above, the radio network 6 and the radio terminal 4 may further perform communication in a fourth cell served by a fourth radio station deployed within the area (coverage) of the third cell 30.

In Procedure Examples 2 and 3 described above, the service A and the service B may be the same service.

In Procedure Example 3 described above, both services A and B may be performed in the cell 20 after the change of the PCell (after the handover of the radio terminal 4).

Procedure Examples 1 to 3 described above can be applied to, but not limited to, a case in which the first radio station 1 is a radio station that serves (manages) a cell having a relatively large coverage and the second radio station 2 is a low-power radio station (Low Power Node (LPN)) that serves (manages) a cell having a small coverage. Examples of a LPN include a radio station having the same functions as the radio station 1 and a new type of network node (New Node) having fewer functions than the radio station 1. Moreover, the second cell 20 may be a new type cell (New Cell Type) which is different from existing cells and uses a new type of carrier (New Carrier Type) different from an existing carrier.

Second Embodiment

In this embodiment, an example in which the first embodiment described above is applied to a 3GPP LTE system will be described. A configuration example of a radio communication system according to this embodiment may be similar to that illustrated in FIG. 1. However, the radio stations 1 to 3 correspond to eNBs, the radio terminal 4 corresponds to a UE, and the core network 5 corresponds to an evolved packet core (EPC). Moreover, eNB1 to eNB3 correspond to a radio access network (RAN). Transmission and reception of information between radio stations (i.e., between eNBs) may use an X2 interface which is a direct interface, may use an S1 interface through a core network, or may use a newly defined interface (e.g., an X3 interface). The radio terminal (UE) 4 supports carrier aggregation (Inter-eNB CA) on a plurality of cells served by different radio stations (eNBs). The expression "Inter-eNB CA" is not limited to a case in which signals are actually received or transmitted in the cells of different eNBs simultaneously. The expression may refer to a case in which signals are received or transmitted in cells of several eNBs actually although a state where signals (e.g., user data or control information) can be received or transmitted in all of the cells of different eNBs is created. The expression may also refer to a case in which different kinds of signals are received or transmitted in respective cells of different eNBs. Alternatively, the expression may refer to a case in which each of the cells of different eNBs is used for either receiving or transmitting signals. In the following description, the radio stations 1 to 3 are referred to as eNB1 to eNB3, the radio terminal 4 are referred to as a UE 4, and the core network 5 will be referred to as an EPC 5.

As described in the first embodiment, the communication status information may include, for example, at least one of the following information elements:

Transmission or reception status of user data (User Plane (U-plane));
Service information;
Bearer information; and
Radio resource configuration information.

The transmission or reception status of user data may be, for example, contents of a SN Status Transfer message that transfers information indicating statuses of a packet data convergence protocol (PDCP) sequence number (SN) and a hyper frame number (HFN). The SN Status Transfer message includes an E-RAB ID, a Receive Status Of UL PDCP SDUs, an UL COUNT Value (PDCP SN+HFN), a DL COUNT Value (PDCP SN+HFN), and the like. Moreover, the transmission or reception status of the user data may be an RLC status (e.g., RLC STATUS PDU).

The service information may include QoS information or a QoS Class Indicator (QCI) value.

The bearer information is information on a signaling radio bearer (SRB), a data radio bearer (DRB), or a network bearer (S1 bearer, E-RAB, or EPS bearer). The bearer information may include, for example, a bearer ID (e.g., drb-Identity, eps-Bearer Identity, E-RAB ID), terminal identification information (e.g., eNB UE S1 AP ID, MME UE S1 AP ID, or TMSI), or network identification information (e.g., GUMMEI, UL GTP Tunnel Endpoint, or DL GTP Tunnel Endpoint).

The radio resource configuration information may include, for example, common radio resource configuration information (Radio Resource Config Common) or dedicated radio resource configuration information (Radio Resource Config Dedicated).

Next, Procedure Examples 4 to 7 of a communication control method in the radio communication system according to this embodiment will be described.

Procedure Example 4

Procedure Example 4 corresponds to Procedure Example 2 described in the first embodiment. That is, when the PCell is changed to the cell 30 of the eNB3 during the period in which the UE 4 experiences the service A in the cell 10 (PCell) of the eNB1 and the service B in the cell 20 (SCell) of the eNB2, the UE 4 and the radio network 6 (i.e., RAN and EPC) perform a handover of the UE 4 while keeping the communication status information on the cells 10 and 20. The UE 4 and the radio network 6 then resume the services A and B in the cell 30 of the eNB3 after the PCell is changed by the handover.

Figure 20:
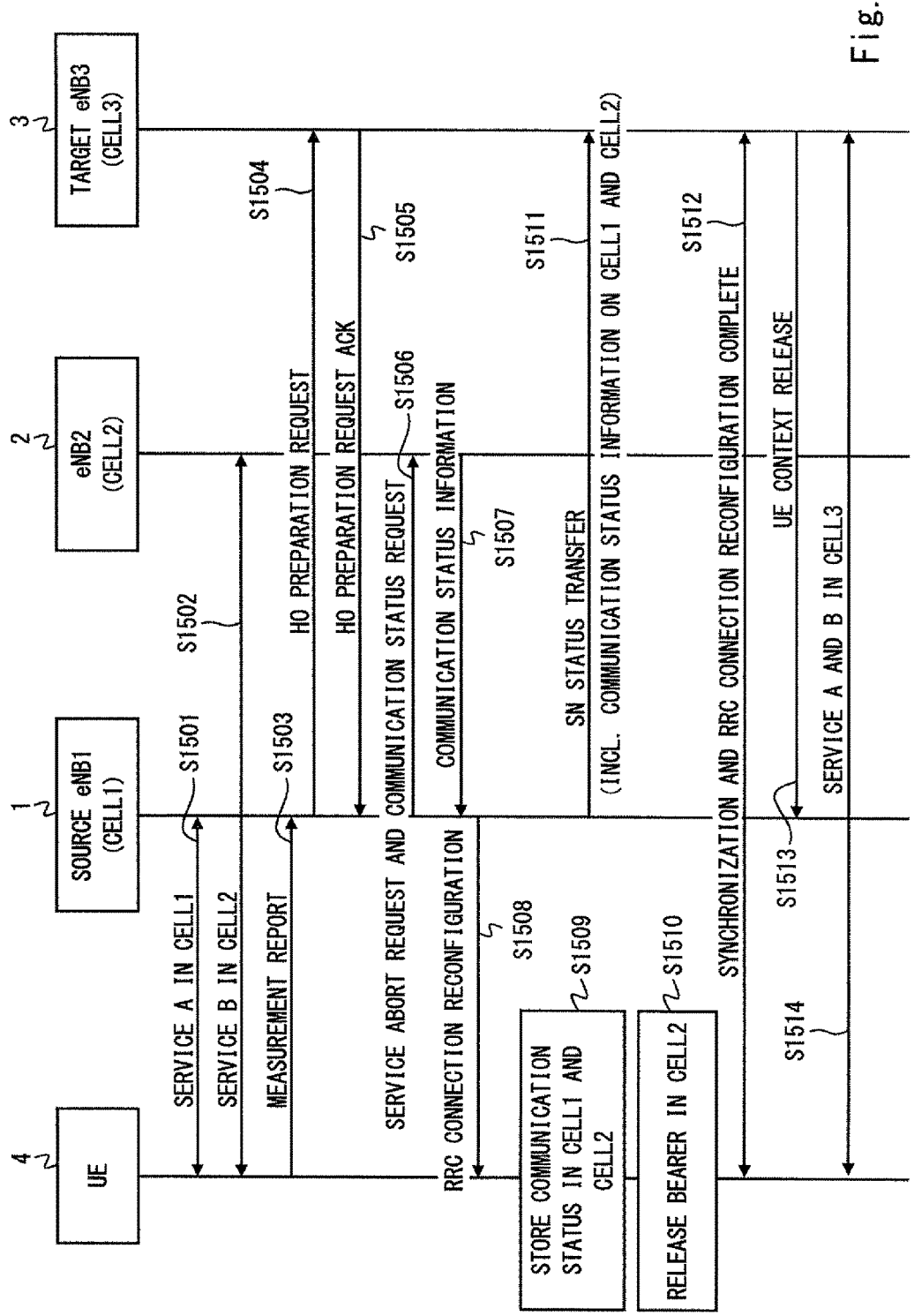
FIG. 20 is a sequence diagram illustrating an example of a communication control method in a radio communication system according to a second embodiment (Procedure Example 4).

FIG. 20 illustrates an example of a sequence diagram illustrating the entire process of Procedure Example 4. In FIG. 20, the first cell 10 is denoted by CELL1, the second cell 20 is denoted by CELL2, and the third cell 30 is denoted by CELL3. In step S1501, the eNB1 and the UE 4 perform communication (service A) using the first cell 10 as the PCell. In step S1502, the eNB2 and the UE 4 perform communication (service B) using the second cell 20 as the SCell. In step S1503, the UE 4 transmits a measurement report to the eNB1. In step S1504, the eNB1 determines a handover of the UE 4 to the third cell 30 based on the measurement report and sends a handover request (HO preparation request) to the eNB3. In step S1505, the eNB1 receives from the eNB3 a response (HO preparation request ACK) to the handover request. In step S1506, the eNB1 sends to the eNB2 an instruction to abort the service B and an instruction to report the communication status information (Service Abort Request and Communication Status Request). In step S1507, the eNB2 aborts the service B in the cell 20 and sends to the eNB1 the communication status information regarding the UE 4 on the cell 20. In step S1508, the eNB1 aborts the service A in the cell 10 and sends a handover instruction (RRC Connection Reconfiguration) to the UE 4. Here, the service abort (Service Abort Request) may be newly defined as a Cause value.

In steps S1509 and S1510, the UE 4 releases the bearer in the cell 20 (Release Bearer in Cell2) and performs a handover from the cell 10 to the cell 30 while keeping the communication status information on the cells 10 and 20. In step S1511, the eNB1 sends a SN STATUS TRANSFER message to the eNB3. The SN STATUS TRANSFER message includes the communication status information regarding the UE 4 on the cells 10 and 20. In step S1512, the eNB3 and the UE 4 establish synchronization in the cell 30 and complete the handover process (Synchronization and RRC Connection Reconfiguration Complete). In step S1513, the eNB3 sends a handover completion notification (UE Context Release) to the eNB1. In step S1514, the eNB3 and the UE 4 resume (continue) the services A and B in the cell 30.

The release of the SCell Bearer by the UE 4 in step S1510 of FIG. 20 may be performed by releasing the radio resource configuration (e.g., Radio Resource Config Common, Radio Resource Config Dedicated), for example. Moreover, the release of the SCell bearer may be performed by releasing either one or both of the Data Radio Bearer (DRB) and Signaling Radio Bearer (SRB) established in the cell 20.

The resuming (continuing) of the service B in step S1514 of FIG. 20 may be performed by re-establishing the Packet Data Convergence Protocol (PDCP) layer and Radio Link Control (RLC) layer corresponding to the bearer (e.g., a radio Bearer) established in the cell 20. Thus, the resuming of the service B in step S1514 can be also referred to as bearer re-establishment or bearer re-configuration.

In Procedure Example 4 described above, the eNB1 may sends only the instruction to abort the service B to the eNB2 instead of sending both the instruction to abort the service B and the instruction to report the communication status of the UE 4. In this case, the eNB1 may send only the communication status information on the Cell1 to the eNB3. Further, in this case, the eNB3 may send, to the eNB2, the instruction to report the communication status of the UE 4. For example, the eNB3 send this instruction after receiving the report of the communication status in the Cell1 from the eNB1, or before or after sending the handover completion notification to the eNB1.

Procedure Example 5

Figure 21:
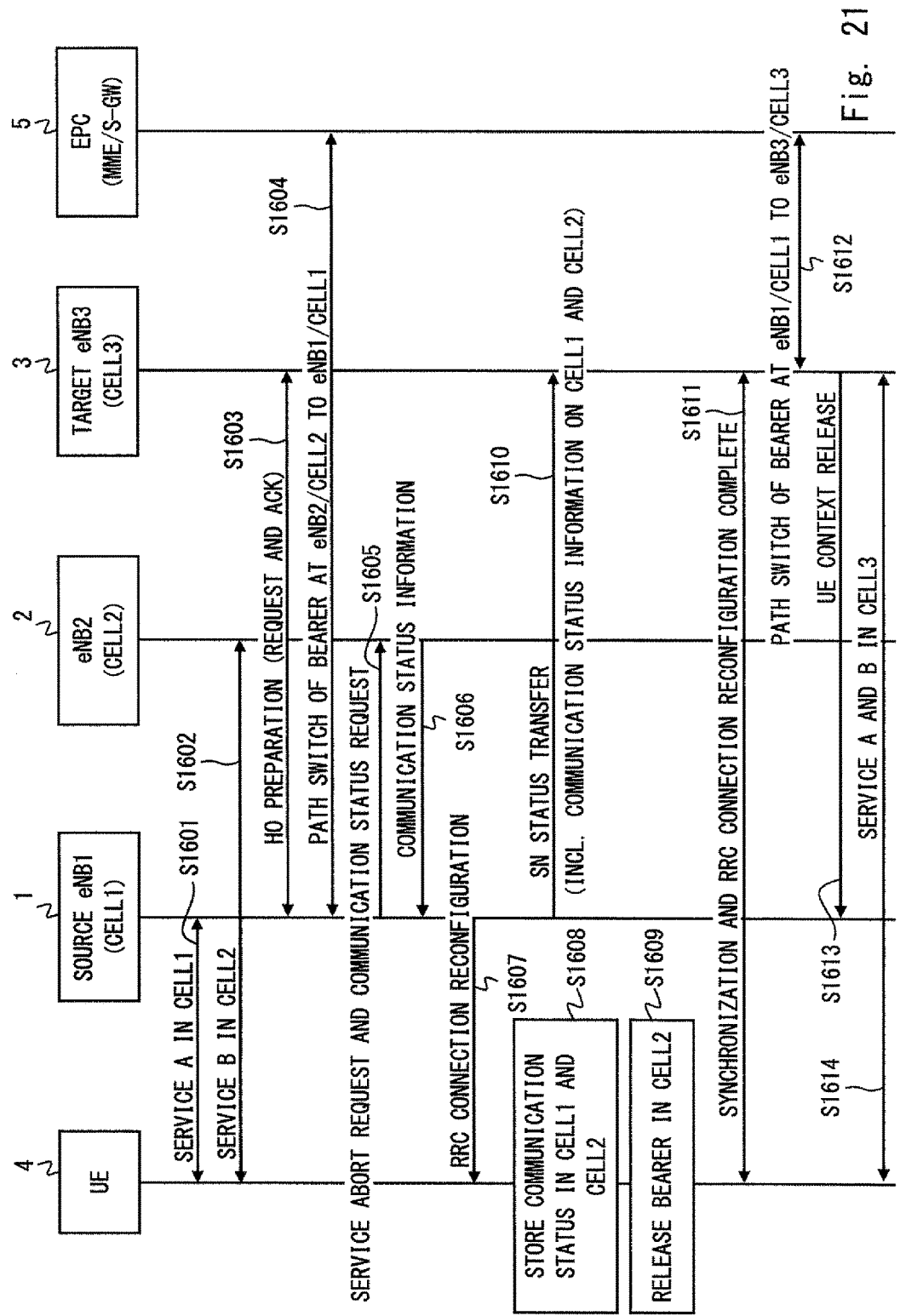
FIG. 21 is a sequence diagram illustrating an example of the communication control method in the radio communication system according to the second embodiment (Procedure Example 5).

In Procedure Example 5, the process of the EPC 5 is added to Procedure Example 4. FIG. 21 is an example of a sequence diagram illustrating the entire process of Procedure Example 5. In FIG. 21, the cells 10, 20, and 30 are denoted by CELL1, CELL2, and CELL3, respectively. The processes of steps S1601 to S1603 of FIG. 21 are similar to the processes of steps S1501 to S1505 of FIG. 20.

In step S1604 of FIG. 21, the eNB1 sends, to the EPC 5 (e.g., a Mobility Management Entity (MME)), a bearer switch request for switching the bearer of the radio terminal 4, which passes through the cell 20 of the eNB2, to a bearer through the cell 10 of the eNB1 (Path switch of bearer at eNB2/Cell2 to eNB1/Cell1). Alternatively, the eNB2 may send the bearer switch request to the EPC 5.

The processes of steps S1605 to S1611 of FIG. 21 are similar to the processes of steps S1506 to S1512 of FIG. 20. In step S1612 of FIG. 21, the eNB3 sends, to the EPC 5 (e.g., an MME), a bearer switch request for switching the bearer of the radio terminal 4, which passes through the cell 10 of the eNB1, to a bearer through the cell 30 of the eNB3 (Path switch of bearer at eNB1/Cell1 to eNB3/Cell3). The processes of steps S1613 to S1614 of FIG. 21 are similar to the processes of steps S1513 to S1514 of FIG. 20.

Procedure Example 6

Procedure Example 6 corresponds to Procedure Example 3 described in the first embodiment. That is, after the eNB2 temporarily suspends the communication (service B) in the cell 20 and the PCell of the UE 4 is changed from the cell 10 to the cell 30, the communication (service B) which has been suspended in the cell 20 is resumed. After the handover of the UE 4 is completed, the eNB3 transmits to the UE 4 an instruction to resume the communication (to resume service) in the cell 20.

Figure 22:
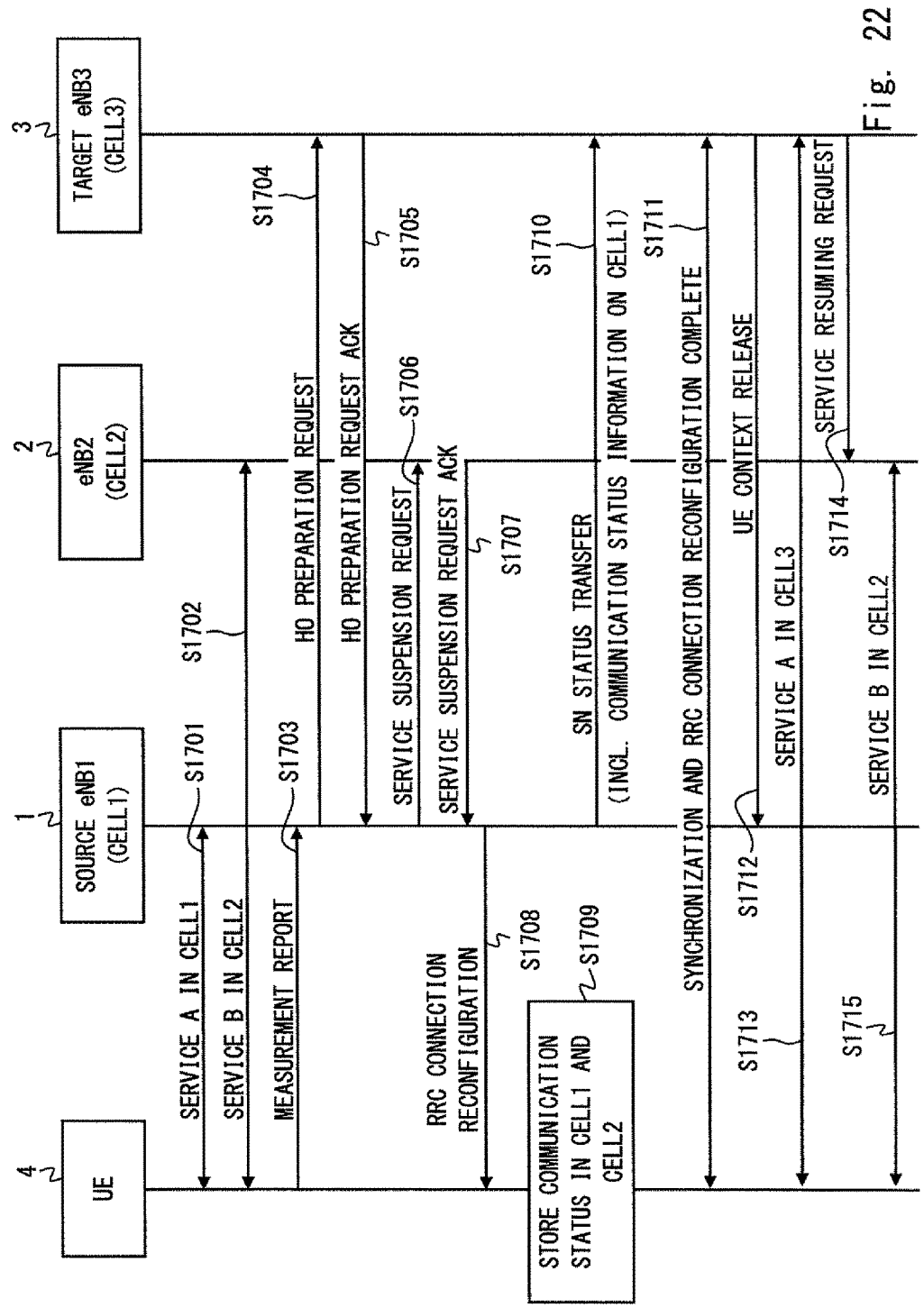
FIG. 22 is a sequence diagram illustrating an example of the communication control method in the radio communication system according to the second embodiment (Procedure Example 6).
Figure 23:
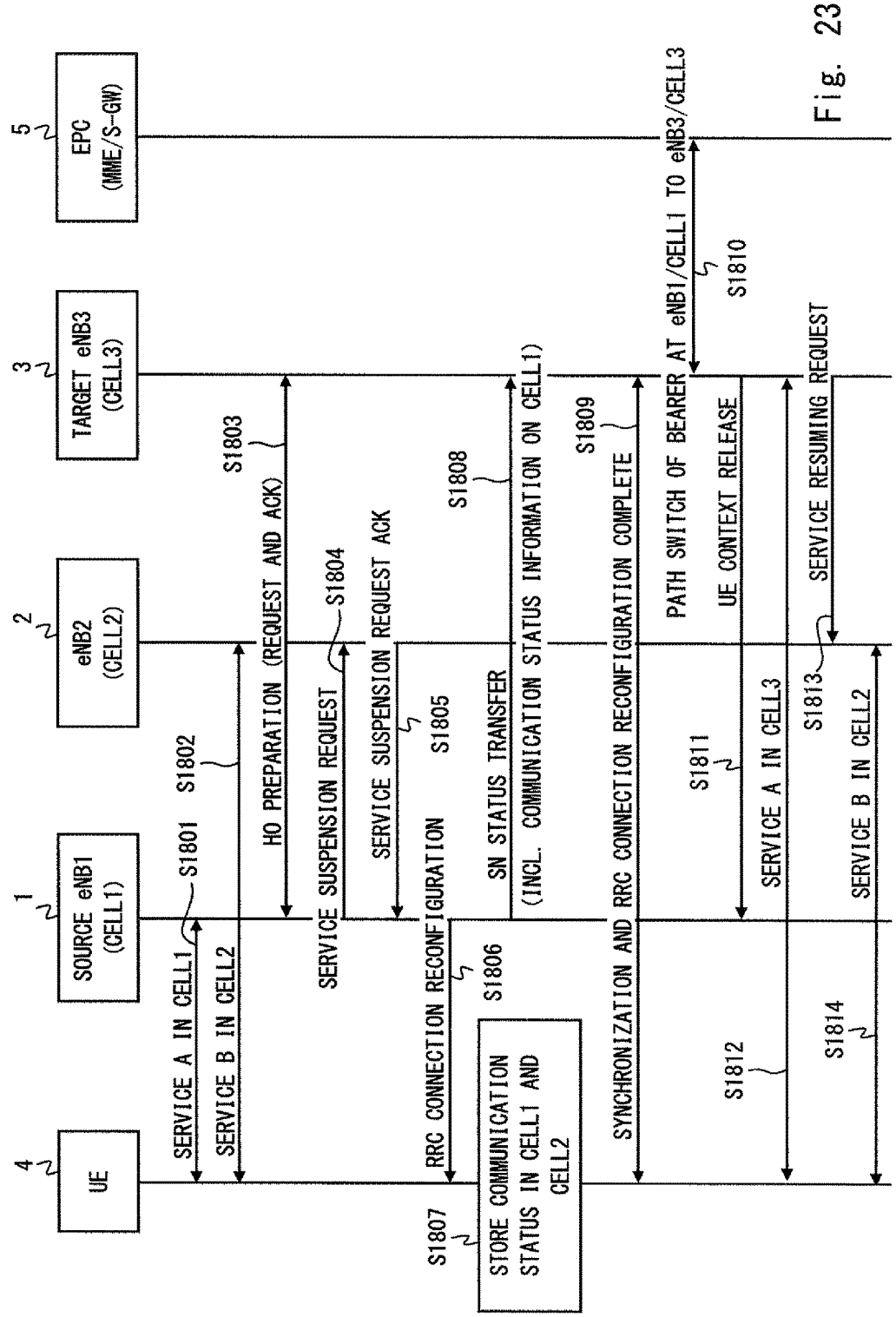
FIG. 23 is a sequence diagram illustrating an example of the communication control method in the radio communication system according to the second embodiment (Procedure Example 7).

FIG. 22 illustrates an example of a sequence diagram illustrating the entire process of Procedure Example 6. In FIG. 23, the cells 10, 20, and 30 are denoted by CELL1, CELL2, and CELL3. The processes of steps S1701 to S1705 of FIG. 22 are similar to the processes of steps S1501 to S1505 of FIG. 20. In step S1706 of FIG. 22, the eNB1 sends to the eNB2 an instruction (Service Suspension Request) to suspend the service B instead of an instruction to abort the service B. In step S1707, the eNB2 suspends the service B and sends to the eNB1 a response (Service Suspension Request ACK) to the suspension instruction. The service suspension instruction can be also referred to as a bearer suspension instruction (Bearer Suspension Request). Moreover, these instructions may be newly defined as Cause values.

The processes of steps S1708 to S1709 of FIG. 22 are similar to the processes of steps S1508 to S1509 of FIG. 20. In Procedure Example 6, the UE 4 does not need to release the bearer in the cell 20. That is, the UE 4 may maintain the bearer in the cell 20 in addition to the communication status information on the cell 20. However, the UE 4 may temporarily release the bearer in the cell 20.

In step S1710 of FIG. 22, the eNB1 sends a SN STATUS TRANSFER message to the eNB3. The message includes the communication status information regarding the radio terminal 4 on the cell 10. The steps S1711 to S1712 of FIG. 22 are similar to steps S1512 to S1513 of FIG. 20. In step S1713 of FIG. 22, the eNB3 and the UE 4 resume the service A of the PCell in the cell 30. In step S1714, the eNB3 sends to the eNB2 an instruction (Resource Resuming Request) to resume the service B of the SCell. In step S1715, the eNB2 and the UE 4 resume the service B of the SCell in the cell 20.

The instruction (Service Resuming Request) to resume the service B in step S1714 of FIG. 22 may be transmitted by the eNB1 or the UE 4 instead of the eNB3. In this case, the eNB1, the eNB2, or the UE 4 may further send a notification of resuming the service B to the eNB3. Alternatively, the eNB1 may send a preliminary notification to the eNB3 to inform that the eNB2 is providing the service B in the cell 20. This preliminary notification may be transmitted using a handover preparation request, a SN status transfer message, or a new message.

In steps S1712 to S1714 of FIG. 22, the following processes may be further performed. After the eNB1 receives a handover completion notification (UE context release) and the handover (i.e., the change of the PCell) is completed, the eNB1 sends to the eNB2 an instruction to establish a connection with the eNB3. In response to the connection establishment instruction from the eNB1, the eNB2 sends a connection establishment request to the eNB3. The eNB2 and the eNB3 then establish a connection. After that, the eNB3 sends to the eNB2 an instruction (Service Resuming Request) to resume the service B. The establishment of connection between the eNB2 and eNB3 includes establishment of an X2 interface between eNBs, establishment of connection through an S1 interface and the EPC, or establishment of a new interface (e.g., X3) between an eNB and an LPN, for example.

Procedure Example 7

In Procedure Example 7, the process of the EPC 5 is added to Procedure Example 6. FIG. 23 illustrates an example of a sequence diagram illustrating the entire process of Procedure Example 7. In FIG. 23, the cells 10, 20, and 30 are denoted by CELL1, CELL2, and CELL3, respectively. The processes of steps S1801 to S1809 of FIG. 23 are the same as the processes of steps S1701 to S1710 of FIG. 22. In step S1810 of FIG. 23, the eNB3 sends, to the EPC 5 (e.g., a Mobility Management Entity (MME)), a bearer switch request for switching the bearer of the radio terminal 4, which passes through the cell 10 of the eNB1, to a bearer through the cell 30 of the eNB3 (Path switch of bearer at eNB1/Cell1 to eNB3/Cell3). The processes of steps S1811 to S1814 of FIG. 23 are similar to the processes of steps S1712 to S1715 of FIG. 22.

OTHER EMBODIMENTS

The first and second embodiments described above may be applied to C/U Split configuration in which a macro cell having a wide coverage is used for transmission and reception of control-plane signals (C-Plane signals) such as mobility management of a UE and a pico cell which provides relatively better communication quality is used for transmission and reception of data-plane signals (U-Plane signals) such as user data. For example, the cells 10 and 30 of the eNB1 and eNB3 may be used for transmission and reception of C-Plane signals and the cell 20 of the eNB2 may be used for transmission of U-Plane signals.

The first and second embodiments described above can be applied to when changing the primary cell (PCell) to another cell of the radio station (eNB) 1 (e.g., a cell using a different frequency or arranged in a different geographical area). Moreover, the first and second embodiments can be applied to a configuration in which a plurality of SCells is present.

The first and second embodiments described above can be applied to a configuration in which the PCell and SCell employ different duplex modes. For example, one of the PCell and SCell may employ a frequency division duplex (FDD) and the other may employ a time division duplex (TDD).

All the communication control methods performed by the radio station 1 (communication control unit 15), the radio station 2 (communication control unit 25), the radio station 3 (communication control unit 35), and the radio terminal 4 (communication control unit 45) described in the first and second embodiments may be implemented by using a semiconductor processing device including an Application Specific Integrated Circuit (ASIC). Alternatively, these methods may be implemented by causing a computer system including at least one processor (e.g., microprocessor, Micro Processing Unit (MPU), Digital Signal Processor (DSP)) to execute a program. Specifically, one or more programs including instructions for causing a computer system to perform the algorithms shown in the flowcharts and the sequence diagrams may be created and these programs may be supplied to a computer.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide a program to a computer via a wired communication line (e.g., electric wires, and optical fibers) or a wireless communication line.

In the above first and second embodiments, the LTE system has been mainly described. However, these embodiments may be applied to radio communication systems other than the LTE system, for example, a 3GPP Universal Mobile Telecommunications System (UMTS), a 3GPP2 CDMA2000 system (1×RTT, High Rate Packet Data (HRPD)), a Global System for Mobile Communications (GSM) system, or a WiMAX system.

Further, the above embodiments are merely examples of applications of technical ideas obtained by the present inventors. Needless to say, these technical ideas are not limited to the above embodiments and may be changed in various ways.

This application is based upon and claims the benefit of priority from Japanese Patent Application No. 2012-288211, filed on Dec. 28, 2012, the disclosure of which is incorporated herein in its entirety by reference.

REFERENCE SIGNS LIST

1 FIRST RADIO STATION
2 SECOND RADIO STATION
3 THIRD RADIO STATION
4 RADIO TERMINAL
5 CORE NETWORK
6 RADIO NETWORK
10 FIRST CELL
20 SECOND CELL
30 THIRD CELL
15 COMMUNICATION CONTROL UNIT
25 COMMUNICATION CONTROL UNIT
35 COMMUNICATION CONTROL UNIT
45 COMMUNICATION CONTROL UNIT

The invention claimed is:
1. A radio communication system comprising:
a radio network including a first radio station configured to operate a first cell, a second radio station configured to operate a second cell, and a third radio station configured to operate a third cell; and
a radio terminal having a capability of Dual Connectivity using either the first cell or the third cell as a primary cell and the second cell as a secondary cell,
wherein the first radio station is configured to, within a procedure changing a radio station operating the primary cell of the radio terminal from the first radio station to the third radio station, transmit a Radio Resource Control (RRC) Connection Reconfiguration message to trigger the radio terminal to:
release configuration information on the second cell except for Data Radio Bearer (DRB) configuration information corresponding to a DRB established in the second cell; and
re-configure the DRB established in the second cell.
2. The radio communication system according to claim 1, wherein the RRC Connection Reconfiguration message is further configured to trigger the radio terminal to re-configure the DRB, which had been established in the second cell, to a DRB in the third cell as the primary cell.

3. The radio communication system according to claim 1, wherein the DRB configuration information is not released within the procedure changing the radio station operating the primary cell of the radio terminal from the first radio station to the third radio station.

4. The radio communication system according to claim 1, wherein the first radio station is configured to receive communication status information on the second cell from the second radio station and to send at least the communication status information to the third radio station.

5. The radio communication system according to claim 1, wherein the third radio station is configured to receive communication status information on the second cell from the second radio station.

6. The radio communication system according to claim 1, wherein the third radio station is configured to allow data communication which has been provided in the second cell to be continuously provided in the third cell after the radio station operating the primary cell is changed from the first radio station to the third radio station.

7. The radio communication system according to claim 1, wherein the second radio station and the radio terminal are configured to suspend data communication which has been provided to the radio terminal in the second cell while the radio station operating the primary cell is being changed from the first radio station to the third radio station and configured to resume the data communication, which has been provided in the second cell, in the second cell after the radio station operating the primary cell is changed from the first radio station to the third radio station.

8. The radio communication system according to claim 4, wherein the communication status information includes at least one of a user data transmission status, a user data reception status, service information, bearer information, and radio resource configuration information.

9. The radio communication system according to claim 8, wherein
the user data transmission status and the user data reception status include at least one of
a Packet Data Convergence Protocol (PDCP) Sequence Number (SN),
an Evolved Universal Terrestrial Access Network (E-UTRAN) Radio Access Bearer (E-RAB) Identity (ID),
a Receive Status of uplink (UL) PDCP service data units (SDUs),
an UL COUNT Value (PDCP SN+Hyper Frame Number (HFN)),
a Downlink (DL) COUNT Value (PDCP SN+HFN), and
a Radio Link Control (RLC) STATUS.

10. The radio communication system according to claim 4, wherein
at least one of the first radio station and the third radio station is configured to request the second radio station to report the communication status information, and
the second radio station is configured to report the communication status information to the first radio station or the third radio station.

11. The radio communication system according to claim 1, wherein
the first radio station is configured to request the second radio station to abort or suspend data communication with the radio terminal in the second cell, and
the second radio station is configured to abort or suspend the data communication with the radio terminal in the second cell.

12. The radio communication system according to claim 1, wherein
the radio network further includes an upper-level network device,
at least one of the first radio station and the second radio station is configured to request the upper-level network device to switch a bearer, configured in the second radio station for the radio terminal, to the first radio station, and
the upper-level network device is configured to switch the bearer for the radio terminal to the first radio station.

13. The radio communication system according to claim 1, wherein
at least one of the first radio station and the third radio station is configured to request the second radio station to resume communication with the radio terminal in the second cell, and
the second radio station is configured to resume the communication with the radio terminal in the second cell.

14. A first radio station configured to operate a first cell, the first radio station comprising:
a transceiver; and
at least one processor configured to, via the transceiver, communicate with a radio terminal capable of performing Dual Connectivity using either the first cell or a third cell of a third radio station as a primary cell and a second cell of a second radio station as a secondary cell, wherein
the at least one processor is further configured to, within a procedure changing a radio station operating the primary cell of the radio terminal from the first radio station to the third radio station, transmit a Radio Resource Control (RRC) Connection Reconfiguration message to trigger the radio terminal to:
release configuration information on the second cell except for Data Radio Bearer (DRB) configuration information corresponding to a DRB established in the second cell; and
re-configure the DRB established in the second cell.

15. The first radio station according to claim 14, wherein the RRC Connection Reconfiguration message is further configured to trigger the radio terminal to re-configure the DRB, which had been established in the second cell, to a DRB in the third cell as the primary cell.

16. The first radio station according to claim 14, wherein
the at least one processor is further configured to receive, from the second radio station, communication status information regarding the radio terminal on the second cell, and send the communication status information to the third radio station, and
the communication status information is used by the third radio station in order to provide, in the third cell, data communication which has been provided to the radio terminal in the second cell as the secondary cell.

17. The first radio station according to claim 14, wherein the DRB configuration information is not released within the procedure changing the radio station operating the primary cell of the radio terminal from the first radio station to the third radio station.

18. A radio terminal comprising:
a transceiver; and
at least one processor configured to perform Dual Connectivity using either a first cell of a first radio station or a third cell of a third radio station as a primary cell and a second cell of a second radio station as a secondary cell, wherein
the at least one processor is further configured to, within a procedure changing the primary cell from the first cell to the third cell:
receive a Radio Resource Control (RRC) Connection Reconfiguration message from the first radio station;
release, in response to the RRC Connection Reconfiguration message, configuration information on the second cell except for Data Radio Bearer (DRB) configuration information corresponding to a DRB established in the second cell; and
re-configure the DRB established in the second cell.

19. The radio terminal according to claim 18, wherein the at least one processor is further configured to re-configure the DRB, which had been established in the second cell, to a DRB in the third cell as the primary cell in response to the RRC Connection Reconfiguration message.

20. The radio terminal according to claim 18, wherein the at least one processor is configured to allow data communication which has been provided to the radio terminal in the second cell as the secondary cell to be resumed in the third cell after the primary cell is changed from the first cell to the third cell.

21. The radio terminal according to claim 18, wherein the DRB configuration information is not released within the procedure changing the primary cell from the first cell to the third cell.

22. A communication control method in a first radio station configured to operate a first cell, the method comprising:
communicating, via a transceiver of the first radio station, with a radio terminal capable of performing Dual Connectivity using either the first cell or a third cell of a third radio station as a primary cell and a second cell of a second radio station as a secondary cell; and
transmitting, within a procedure changing a radio station operating the primary cell of the radio terminal from the first radio station to the third radio station, a Radio Resource Control (RRC) Connection Reconfiguration message to trigger the radio terminal to:
release configuration information on the second cell except for Data Radio Bearer (DRB) configuration information corresponding to a DRB established in the second cell; and
re-configure the DRB established in the second cell.

23. The communication control method according to claim 22,
wherein the RRC Connection Reconfiguration message is further configured to trigger the radio terminal to re-configure the DRB, which had been established in the second cell, to a DRB in the third cell as the primary cell.

24. The communication control method according to claim 22,
wherein the DRB configuration information is not released within the procedure changing the radio station operating the primary cell of the radio terminal from the first radio station to the third radio station.

25. A communication control method in a radio terminal, the method comprising:
performing Dual Connectivity using either a first cell of a first radio station or a third cell of a third radio station as a primary cell and a second cell of a second radio station as a secondary cell;
receiving, within a procedure changing the primary cell from the first cell to the third cell, a Radio Resource Control (RRC) Connection Reconfiguration message from the first radio station;
releasing, in response to the RRC Connection Reconfiguration message, configuration information on the second cell except for Data Radio Bearer (DRB) configuration information corresponding to a DRB established in the second cell; and
re-configuring the DRB established in the second cell.

26. The communication control method according to claim 25, further comprising:
re-configuring the DRB, which had been established in the second cell, to a DRB in the third cell as the primary cell in response to the RRC Connection Reconfiguration message.

27. A non-transitory computer-readable medium storing therein a program for causing a computer to perform a communication control method in a first radio station configured to operate a first cell, wherein the communication control method comprises:
communicating, via a transceiver of the first radio station, with a radio terminal capable of performing Dual Connectivity using either the first cell or a third cell of a third radio station as a primary cell and a second cell of a second radio station as a secondary cell; and
transmitting, within a procedure changing a radio station operating the primary cell of the radio terminal from the first radio station to the third radio station, a Radio Resource Control (RRC) Connection Reconfiguration message to trigger the radio terminal to:
release configuration information on the second cell except for Data Radio Bearer (DRB) configuration information corresponding to a DRB established in the second cell; and
re-configure the DRB established in the second cell.

28. A non-transitory computer-readable medium storing therein a program for causing a computer to perform a communication control method in a radio terminal, wherein the communication control method comprises:
performing Dual Connectivity using either a first cell of a first radio station or a third cell of a third radio station as a primary cell and a second cell of a second radio station as a secondary cell;
receiving, within a procedure changing the primary cell from the first cell to the third cell, a Radio Resource Control (RRC) Connection Reconfiguration message from the first radio station;
releasing, in response to the RRC Connection Reconfiguration message,
configuration information on the second cell except for Data Radio Bearer (DRB) configuration information corresponding to a DRB established in the second cell; and
re-configuring the DRB established in the second cell.

* * * * *